(12) United States Patent
Uenaka

(10) Patent No.: US 6,456,789 B1
(45) Date of Patent: Sep. 24, 2002

(54) DEVICE FOR CORRECTING A TREMBLE OF A FOCUSED IMAGE AND A CAMERA WHICH IS PROVIDED WITH THE SAME

(75) Inventor: Yukio Uenaka, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/547,047

(22) Filed: Apr. 10, 2000

(30) Foreign Application Priority Data

Apr. 12, 1999 (JP) .......................................... 11-104097

(51) Int. Cl.$^7$ .............................................. G03B 17/00
(52) U.S. Cl. ......................................... 396/55; 348/208
(58) Field of Search .............................. 396/52, 53, 54, 396/55; 348/208

(56) References Cited

U.S. PATENT DOCUMENTS

| 5,150,150 A | 9/1992 | Enomoto |
| 5,655,157 A | 8/1997 | Enomoto |
| 5,809,349 A | 9/1998 | Donner |
| 5,845,156 A * | 12/1998 | Onuki .......................... 396/52 |

FOREIGN PATENT DOCUMENTS

JP          7-261230        10/1995

* cited by examiner

Primary Examiner—Russell Adams
Assistant Examiner—Arthur A Smith
(74) Attorney, Agent, or Firm—Greenblum & Bernstein, P.L.C.

(57) ABSTRACT

When a focused image tremble is within a correctable range of a correction lens which is included in a photographing optical system, the correction lens is driven following the focused image tremble. While the focused image tremble is out of the correctable range, the correction lens is driven to approach to a standard position, at which an optical axis of the correction lens is coaxial with an optical axis of other optical systems included in the photographing optical system, by a predetermined time constant. When a direction of the focused image tremble is reversed after the focused image tremble becomes beyond the correctable range, the focused image tremble is supposed to be displaced at a position corresponding to a position at which the correction lens would be situated at that time, and the driving of the correction lens is restarted.

7 Claims, 14 Drawing Sheets

DEVICE FOR CORRECTING A TREMBLE OF A FOCUSED IMAGE AND A CAMERA WHICH IS PROVIDED WITH THE SAME

BACKGROUND OF THE INVENTION

1. Field of the Invention

This invention relates to a device for correcting a tremble of a focused image of an object caused by an oscillation of an optical device due to, for example, a hand tremble.

2. Description of the Related Art

Usually, an optical device is provided with a device for correcting a tremble of an focused image. The device for correcting the tremble includes a sensor of angular speed, and a correcting optical system which is placed on an optical path of a photographing optical system of the optical device. An amount of trembling of the optical device is calculated by integrating a signal output from the sensor of angular speed. The correcting optical system is driven so that the tremble of the focused image, caused by an oscillation of the optical device, is canceled.

Accordingly, a movement of an object image on, for example, a surface of a camera film and a light receiving surface of photoelectric conversion element is corrected. Namely, the focused image tremble of the object is corrected. Usually, the correction of the focused image tremble is carried out during the exposure period. However, if a single lens reflex camera, in which a finder optical system includes a photographing optical system, is provided with the device for correcting the focused image tremble, the correction of the focused image tremble is carried out during a photometry period. During the photometry period, a user views the object through a finder.

However, during the photometry period, the camera is often panned widely in one direction for deciding on or changing a composition, causing a focused image tremble larger than that due to a hand tremble. Namely, the focused image tremble, beyond a range in which the focused image tremble is able to be corrected by the correction optical system, may occur during the photometry period. If the focused image tremble exceeds the range, the correction of the focused image tremble is stopped till the focused image tremble is restored to the range. Accordingly, a problem occurs in which the focused image tremble due to the hand tremble is not sufficiently corrected, just after the camera is panned.

SUMMARY OF THE INVENTION

Therefore, an object of the present invention is to provide a device for correcting the focused image tremble, which can restart its control in a short time, after a large focused image tremble, which is unable to be corrected, occurs. Another object of the present invention is to provide a camera, provided with the correcting device.

In accordance with an aspect of the present invention, there is provided a device for correcting a tremble of a focused image comprising: a tremble detector that detects a tremble of optical axes of an optical device; correction optical systems that correct the tremble of the optical axes; driving devices that drive the correction optical systems; a controlling system that controls the driving devices such that the correction optical systems are driven following the tremble of the optical axes in order to cancel a focused image tremble of an object due to the tremble of the optical axes.

The controlling system controls the driving devices such that: when the tremble of the optical axes becomes beyond a correctable range of the correction optical systems, the correction optical systems are stopped from being driven following the tremble of the optical axes; and when a direction of the tremble of the optical axes is reversed in a situation that the tremble of the optical axes is out of the correctable range, the correction optical systems are restarted, after having been stopped, to be driven following the tremble of the optical axes.

The controlling system controls the driving devices, such that from a time after which the tremble of the optical axes becomes beyond the correctable range till a time at which the direction of the tremble of the optical axes is reversed, the correction optical systems approach a standard position by a predetermined time constant. The optical axes of the correction optical systems are coaxial with optical axes of other optical systems of imaging optical systems of the optical device at the standard position.

The predetermined time constant is set such that the correction optical systems reach the standard position from a boundary position of the correctable range in approximately 5 seconds.

When the tremble of the optical axes becomes beyond the correctable range, the correction optical systems are not driven. Then when the direction of the tremble of the optical axes is reversed, the controlling system starts the correction optical systems. Further, the controlling system stops the correction optical systems at positions at which the correction optical systems are situated immediately before the tremble of the optical axes becomes beyond the correctable range.

The optical device further comprises: a photographing optical system; and a photographing control system that records an image of the object, controlling an image capturing operation. The controlling system carries out the stop and the restart control of driving the correction optical systems after the tremble of the optical axes becomes beyond the correctable range, only when the image capturing operation is not carried out.

In accordance with another aspect of the present invention, there is provided a camera which is provided with a device for correcting a tremble of a focused image comprising: a photographing optical system; tremble detectors that detect a tremble of an Optical axis of the photographing optical system; a correction optical system that corrects the tremble of the optical axis, being provided for the tremble correcting device so as to be included in the photographing optical system; a driving device that drives the correction optical system; a photographing controlling system that records an image of the object, controlling an image capturing operation; and a tremble correction controlling system that controls the driving device such that the correction optical system is driven following the tremble of the optical axis in order to cancel a focused image tremble of an object due to the tremble of the optical axis. The tremble correction controlling system controls the driving device such that: when the tremble of the optical axis becomes beyond a correctable range of the correction optical system, the correction optical system is stopped from being driven following the tremble of the optical axis; and when a direction of the tremble of the optical axis is reversed in a situation that the tremble of the optical axis is out of the correctable range, the correction optical system is restarted to be driven following the tremble of the optical axis.

The tremble correction controlling system controls the driving device, such that from a time after which the tremble of the optical axis becomes beyond the correctable range till a time at which the direction of the tremble of said optical axis is reversed, said correction optical system approaches a standard position by a predetermined time constant, an optical axis of the correction optical system being coaxial with optical axes of other optical systems of the photographing optical system at the standard position.

The predetermined time constant is set such that the correction optical system reaches the standard position from a boundary position of the correctable range in approximately 5 seconds.

When at a time after the focused image tremble becomes beyond the correctable range, the correction optical system is not driven. Then when the direction of the tremble of the optical axis is reversed, the controlling system starts the correction optical system. Further, the controlling system stops the correction optical system at a position at which the correction optical system is situated immediately before the tremble of the optical axis of the photographing optical system becomes beyond the correctable range.

BRIEF DESCRIPTION OF THE DRAWINGS

The object and other objects of the present invention will be better understood from the following description, with reference to the accompanying drawings, in which:

FIG. 5 is a flowchart indicating procedures of a camera controlling sequence of the first embodiment, from the time at which a power switch is turned ON to the time at which photometric switch is turned ON;

FIG. 6 is a flowchart indicating procedures of the camera controlling sequence of the first embodiment, from the time at which the photometric switch is turned ON to the time at which a release switch is turned ON;

DESCRIPTION OF THE PREFERRED EMBODIMENTS

An embodiment according to the present invention will be explained with reference to the figures. Note that, in this specification, "a perpendicular plan" means a plan parallel to a surface of a film when a camera is held in such a manner that an optical axis of a photographing optical system is positioned horizontally. Further, "a horizontal axis" means an axis which divides the camera into two parts in the vertical direction, crossing the optical axis of the photographing optical system in the perpendicular plan, and "a vertical axis" means an axis which divides the camera into two parts in a lateral direction.

Figure 1:
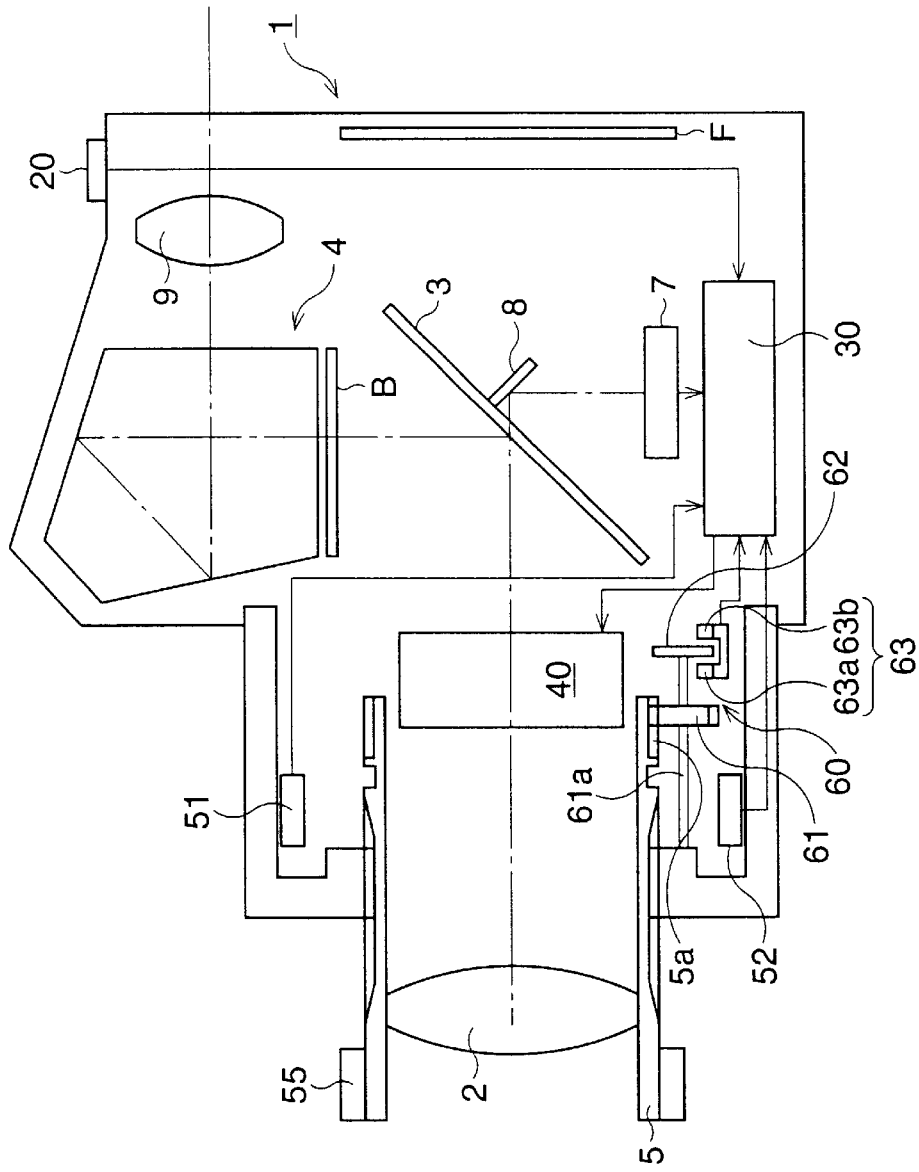
FIG. 1 is a block diagram of a camera, including a function of correcting a tremble of a focused image, to which a first embodiment, according to the present invention, is applied.

FIG. 1 is shows a camera 1, including a correcting function of a focused image to which an embodiment, according to the present invention, is applied. The camera 1 is provided with a group 2 of optical systems which is included in a photographing optical system, a quick return mirror 3, a finder optical system 4, an AF sensor 7, a sub-mirror 8, a shutter button 20, a controlling system 30 and a correcting system 40 of a focused image tremble. An object image is imaged on a surface of a film F, which is an image receiving surface, by the photographing optical system. A luminance reflected by the object is led to an eye of a user, by the finder optical system 4, after passing through the group 2 of optical systems of the photographing optical system and being reflected by the quick return mirror 3. The luminance reflected by the object is also led to the AF sensor 7 after being reflected by the sub-mirror 8. The controlling system 30 wholly controls the camera 1.

Further, the camera 1 is provided with angular speed sensors 51, 52 and a lens movement detector 60. A tremble of the photographing optical system is sensed by the angular speed sensors 51 and 52. The movement of the photographing optical system along the optical axis is detected by the lens movement detector 60.

The shutter button 20 can be pushed by one step to turn a photometry switch to an ON position, and can be pushed by two steps to turn a release switch to an ON position. The information of ON/OFF position of these switches is input into the controlling system 30. Note that, the photometry switch and the release switch are omitted in FIG. 1.

The angular speed sensor 51 is provided for detecting an angular speed of the rotational movement of the camera 1 in a lengthwise direction (the vertical direction). The angular speed sensor 51 outputs a voltage corresponding to the angular speed in the lengthwise direction due to, for example, a hand tremble. The angular speed sensor 52 is provided for detecting an angular speed of the rotational movement of the camera 1 in a direction perpendicular to a sheet of FIG. 1 (horizontal direction). The angular speed sensor 52 outputs a voltage corresponding to the angular speed in the lateral direction due to, for example, the hand tremble.

The correcting system 40 for the focused image tremble is provided with a correcting optical system which is included in the photographing optical system and a driving system to drive the correcting optical system. The correcting optical system is provided for deflecting the optical axis of the photographing optical system. The driving system drives the correcting optical system, in accordance with a controlling signal output from the controlling system 30, so that the movement of the object image formed on the surface of the film F by the photographing optical system can be canceled. The driving system deflects the optical axis of the photographing optical system independently in the perpendicular direction to the sheet of FIG. 1 and the lengthwise direction.

When the movement of the photographing optical system is detected by the lens movement detector 60 and when the photographing is performed, the controlling system 30 corrects the focused image tremble, on the surface of the film F and in a finder view, by driving the correcting optical system 40 based on input signals from the angular speed sensors 51 and 52.

In FIG. 1, the group 2 of the optical systems of the photographing optical system is depicted as a single lens. However, the group 2 practically includes a plurality of lens or lens groups. Some or all of the lenses can be moved along the optical axis of the photographing optical system, for focusing operation and zooming operation. In this embodiment, the lens movement detector 60 detects the movement of a lens group provided for the focusing operation. This lens group is referred to as a "focusing lens". Further, S the photographing optical system is composed of the group 2 of the optical systems and the correcting optical system of the tremble correcting system 40. Note that, the group 2 of the optical systems is referred to as "other optical systems" in this specification.

The quick return mirror 3 is set to a down position as shown in FIG. 1, when an object is viewed through the finder optical system 4. A luminance reflected by the object, which is incident on the camera 1 through the photographing optical system including the focusing lens and the correction system 40, is reflected by the quick return mirror 3 to be led to a focusing screen B. The object image on the focusing screen B is inverted by a pentagonal prism included in the finder optical system 4, so that the user views the object image on the focusing screen B as an erected image through an eyepiece lens 9. Namely, in this embodiment, a finder optical system in a broad sense is provided with the photographing optical system including the focusing lens, the correction optical system of the correction system 40, the quick return mirror 3, the focusing screen B, the pentagonal prism and the eyepiece lens 9.

The quick return mirror 3 and a sub-mirror 8 are set to an up position, at which the quick return mirror 3 faces to the focusing screen B, by a mirror driving device (omitted in FIG. 1), when the photographing is carried out. Accordingly, when the photographing is carried out, the luminance reflected by the object is led to the surface of the film F through the photographing optical system (the other optical systems 2 and the correction optical system of the focused image correcting device 40), so that the object image is imaged on the surface of the film F. The object image is recorded on the surface of the film F to be printed.

When a lens barrel 5 is rotated, the focusing lens is moved along the optical axis of the photographing optical system, by a cam mechanism (omitted in FIG. 1) which. is well-known. The lens barrel 5 is rotated by a motor mounted on a body of the camera 1 or on a lens unit, or by a user's manual operation of a focusing ring 55.

An AF sensor 7 detects a defocus amount of the photographing optical system by a phase difference detecting method, which is a well-known sensor. An image sensor (omitted in FIG. 1) included in the AF sensor 7 is placed to be optically equivalent to the focusing screen B and the surface of the film F. A focusing condition on the focusing screen B is similar to a focusing condition on the surface of the film F. Accordingly, when the object image is focused on the focusing screen B by the photographing optical system, in other words, when the focal point of the photographing optical system is coincident with the focusing screen B, the object image is focused on the surface of the film F.

The AF sensor 7 detects the focusing condition of the object image on the surface of the film F as the defocus amount. Namely, the AF sensor 7 detects the defocus amount which indicates a direction and distance of a present position of the focal point of the image formed by the photographing optical system, from the focusing screen B and the surface of the film F. The controlling system 30 calculates a driving direction and a driving amount of the focusing lens based on the defocus amount detected by the AF sensor 7. The focusing lens is driven in accordance with a result of the calculation of the controlling system 30, so that an automatic focusing is performed.

The lens movement detector 60 is provided with a pinion gear 61, a slit board 62 and a photo interrupter 63. The pinion gear 61 is engaged with a rack 5a which is formed on an outer surface the lens barrel 5. A shaft 61a is fixedly engaged at a center of pinion gear 61, being perpendicular to the pinion gear 61. The slit board 62 is fixedly supported by one end of the shaft 61a. Another end of the shaft 61a is rotatably received by a hole formed on an inner wall of the body of camera 1. Namely, the slit board 62 is rotated in accordance with a rotational movement of the pinion gear 61. A plurality of slits are radially formed on the slit board 62 around a rotating axis of the slit board 62. The photo interrupter 63 includes a light emitting portion 63a and a light receiving portion 63b. The slit board 62 is placed between the light emitting portion 63a and the light receiving portion 63b. The light receiving portion 63b outputs a signal depending upon whether a light is received. Namely, the signal is periodically output from the light receiving portion 63b in accordance with a rotation of the slit board 62. As described above, the lens barrel 5 is rotated by the motor mounted on the body of the camera 1 or the lens unit in an auto focus mode, and rotated by the user's manual operation in a manual mode. Accordingly, a pulse signal is output from the light receiving portion 63b in accordance with the rotation of the slit board 62 accompanying the rotation of the lens barrel 5 in the focusing operation.

Figure 2:
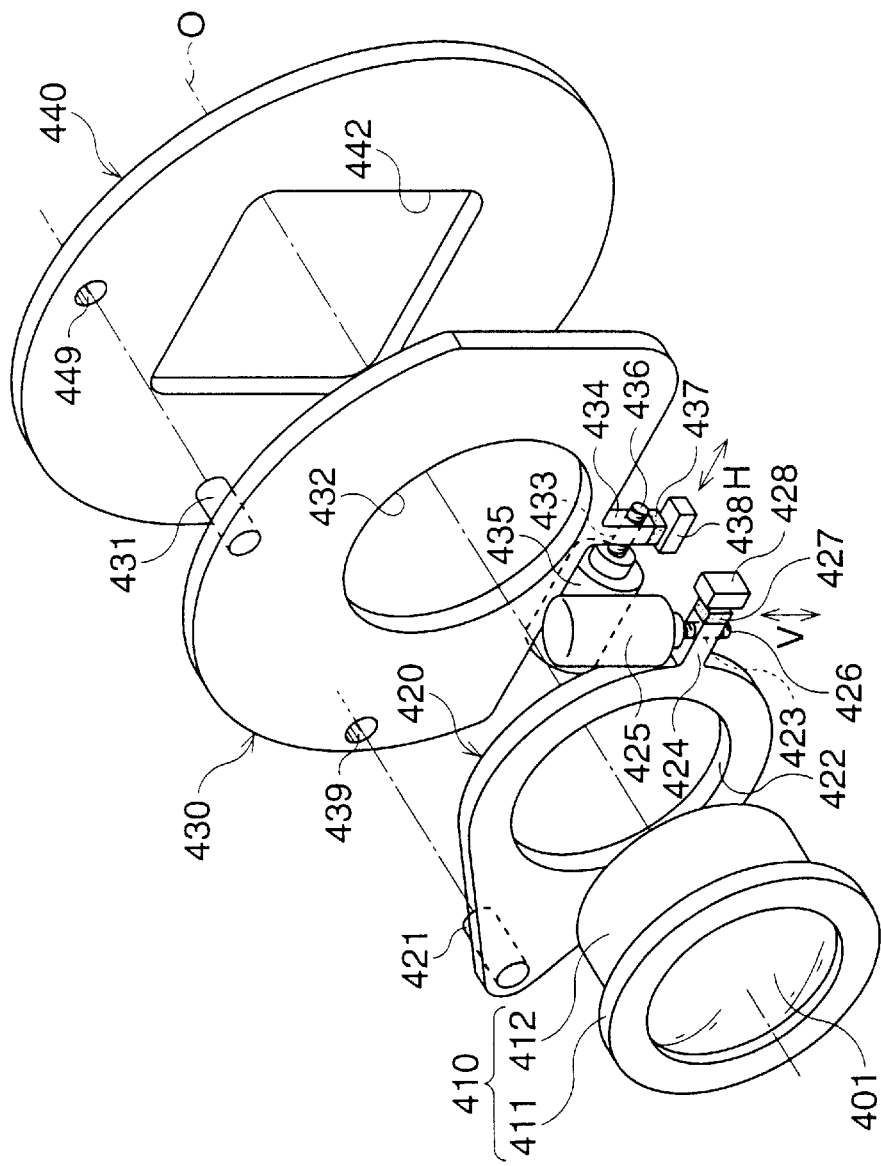
FIG. 2 is a perspective view of a driving device of correcting optical systems of the first embodiment.

FIG. 2 is an exploded perspective view of the correcting system 40 of the focused image tremble. A correction lens 401, which is a part of the correcting optical system, is fixedly engaged in a lens frame 410. The lens frame 410 is fixed to a first rotating board 420. The first rotating board 420 is rotatably mounted on a second rotating board 430 by a pivot shaft 421. The second rotating board 430 is rotatably mounted on a base board 440 by a pivot shaft 431. The pivot shaft 431 is positioned, being rotated from the pivot shaft 421 by 90 degrees with an optical axis O of the photographing optical system (omitted in FIG. 2) being a rotational center. The base board 440 is fixedly mounted in the camera 1.

Accordingly, the correction lens 401 is held, being movable in directions H and V (indicated by arrows in FIG. 2) in a plan perpendicular to the optical axis O in accordance with the rotational movement of the first and second rotating boards 420, 430.

The lens frame 410 includes a large diameter portion 411 and a small diameter portion 412. The small diameter portion 412 is engaged with an opening portion 422 of the first rotating board 420. The pivot shaft 421 is received by a pivot hole 439 which is formed on the second rotating board 430. An arm 424 is formed at an opposite side to the pivot shaft 421 with the opening portion 422 therebetween. A screw hole 423 is formed in the arm 424.

A screw 426, which is connected to a rotational axis of a motor 425 by a flexible joint, is threadably engaged with the screw hole 423. The motor 425 is fixed on the second rotating board 430. When the motor 425 is driven, the first rotating board 420 is rotatably moved around the pivot shaft 421 in the direction V, in accordance with the rotational movement of the screw 426.

A magnet 427 is mounted on an tip end of the arm 424. An MR (Magnetic Resistance) sensor 428 is mounted on the second rotating board 430, facing to the magnet 427. Positional data of the magnet 427 is detected by the MR sensor 428. The controlling system 30 detects the movement of the correction lens 401 in the direction V by an output signal from the MR sensor 428.

The pivot shaft 431 is received by a pivot hole 449 which is formed on the base board 440. An opening portion 432, by which the small diameter portion 412 is received, is formed on the second rotating board 430. The opening portion 432 is formed in such a manner that, the movement of the small diameter portion 412, in accordance with the rotation of the first rotating board 420, is not prevented, when the first rotating board 420 is mounted on the second rotating board 430.

A driving arm 434 is formed at an opposite side to the pivot shaft 431 with the opening portion 432 therebetween. A screw 436, which is connected to a rotational axis of a motor 435 by a flexible joint, is threadably engaged with the screw hole 433. When the motor 435 is driven, the second rotating board 430 is rotatably moved around the pivot shaft 431 in the direction H, in accordance with the rotational movement of the screw 436.

A magnet 437 is mounted on an tip end of the driving arm 434. An MR sensor 438 is mounted on the base board 440, facing to the magnet 437. Positional data of the magnet 437 is detected by the MR sensor 438. The controlling system 30 detects the movement of the correction lens 401 in the direction H by an output signal from the MR sensor 438.

An opening portion 442, through which the small diameter portion 412 is pierced, is formed on the base board 440. The opening portion 442 is formed in such a manner that the movement of the small diameter portion 412, in accordance with the rotation of the first and second rotating boards 420, 430, is not prevented.

Figure 3:
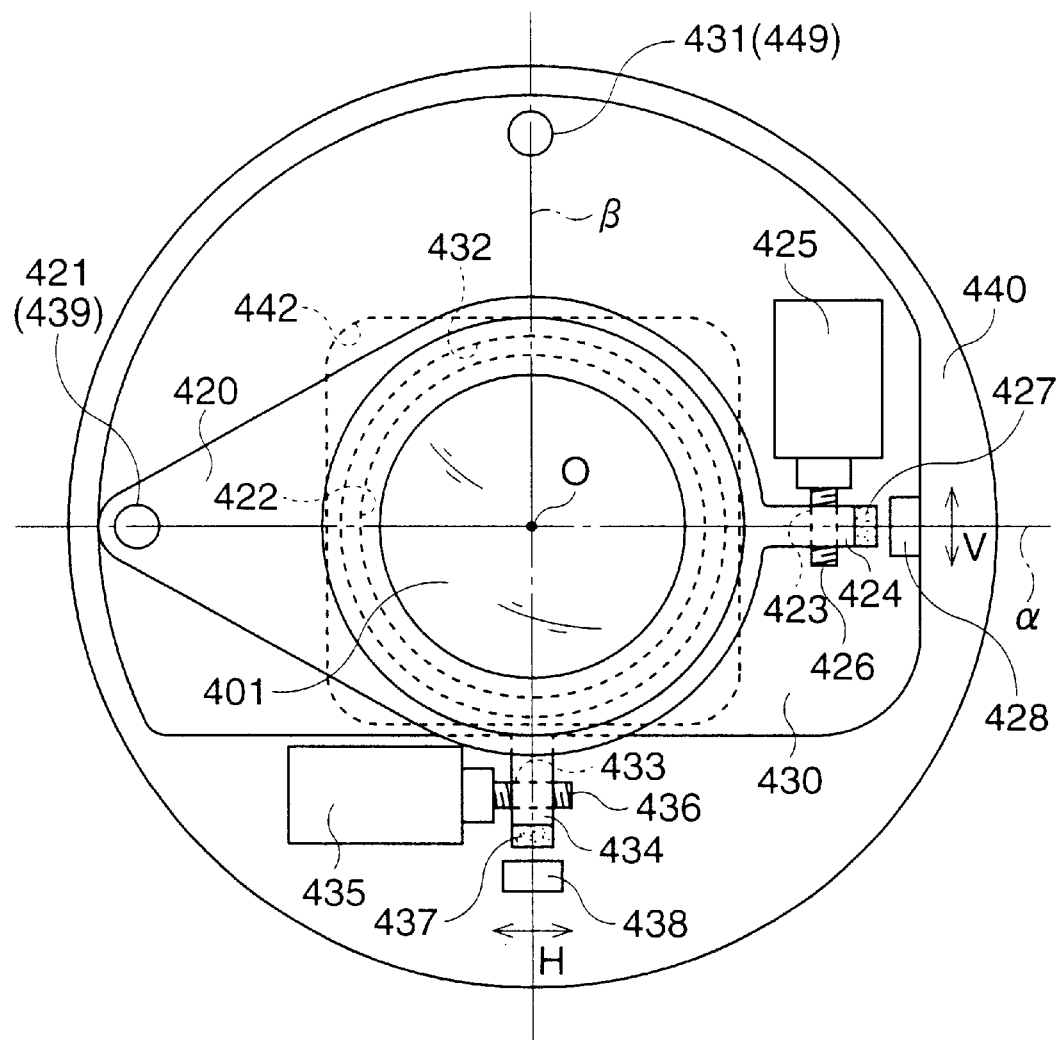
FIG. 3 is a front view of the driving device of FIG. 2, viewed from the side of a photographing optical system.

FIG. 3 is a front view showing the correcting system 40, in which the lens frame 410, the first rotating board 420, the second rotating board 430 and the base board 440 are constructed, depicted from the side of the other optical systems 2 of the photographing optical system. In FIG. 3, an optical axis of the correction lens 401 is coaxial with the optical axis of the other optical systems 2 of the photographing optical system. Namely, in FIG. 3, the optical axis of the correction lens 401 coincides with the optical axis of the other optical system 2. This situation is referred to as a "standard situation". In the standard situation, the rotational center of the pivot shaft 421 of the first rotating board 420, the optical axis O, the magnet 427 and the MR sensor 428 are positioned on a straight line α. Similarly, in the standard situation, the rotational center of the pivot shaft 431 of the second rotating board 430, the optical axis O, the magnet 437 and the MR sensor 438 are positioned on a straight line β.

Note that, the straight line α corresponds to the above mentioned horizontal axis, and the straight line β corresponds to the above mentioned vertical axis.

Figure 4:
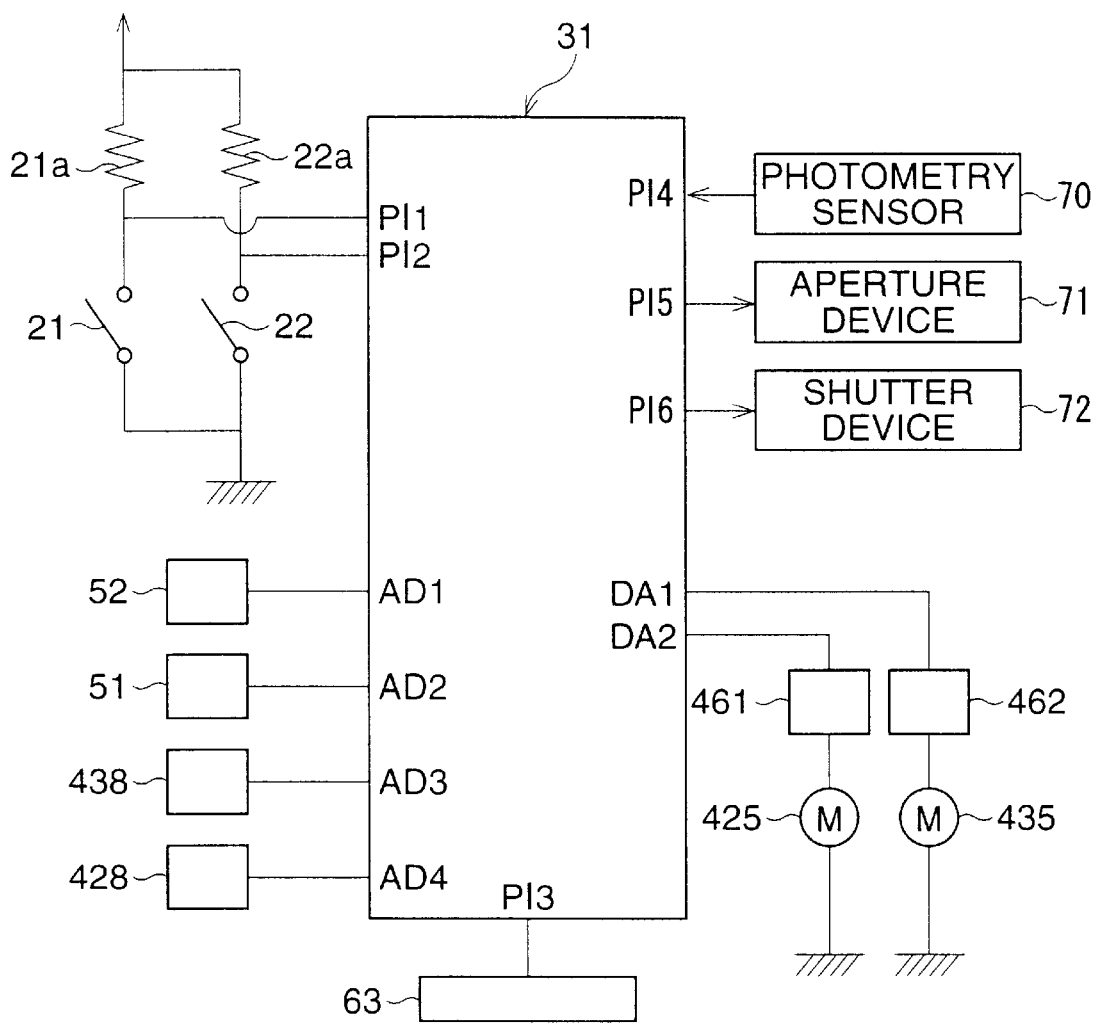
FIG. 4 is a block diagram of a controlling system of the camera of the first embodiment.
Figure 5:
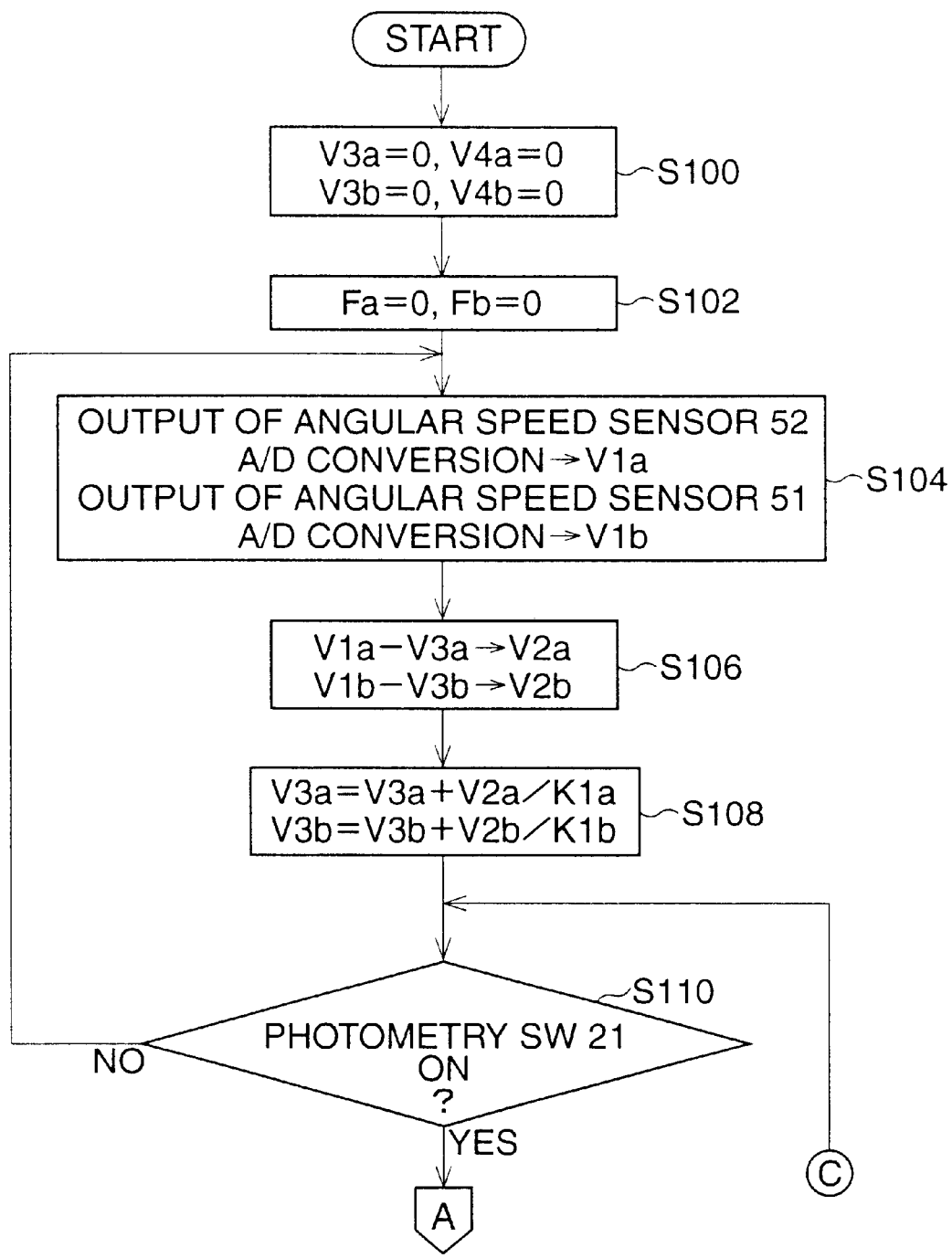

FIG. 4 is a block diagram of the controlling system 30. Input and output signals of a CPU 31 which is provided for the controlling system 30, will be explained with reference to the block diagram. Information of the ON/OFF status of the photometry switch 21, in accordance with the shutter button 20 (see FIG. 1), is input to a port PI1 of the CPU 31, as a digital signal of one bit. Also, information of the ON/OFF status of the release switch 22, in accordance with the shutter button 20, is input to a port PI2 of the CPU 31, as a digital signal of one bit. Voltage output from the angular speed sensor 51 is input to an A/D conversion port AD2, and voltage output from the angular speed sensor 52 is input to an A/D conversion port AD1. Voltage output from the MR sensor 428 is input to an A/D conversion port AD4 of the CPU 31, and voltage output from the MR sensor 438 is input to an A/D conversion port AD3 of the CPU 31.

A motor 435, which drives the second rotating board 430, is connected to a D/A output port DA1, and a motor 425, which drives the first rotating board 420, is connected to a D/A output port DA2. In the CPU 31, moving amounts of the correction lens 401 in the directions H and V, by which the focused image tremble is corrected, are calculated based on the above mentioned input signals, and the moving amounts of the correction lens 401 are respectively converted to the driving amounts of the motors 425 and 435. Then, voltage corresponding to the driving amounts of the motors 435 and 425 is respectively output from the D/A ports DA1 and DA2.

In the CPU 31, an exposure value (Ev) is calculated by performing a photometry operation of a luminance reflected by the object through a photometry sensor 70, when the ON signal is input to the first input port PI1 after the photometry switch is turned to the ON position by pushing the shutter button 20 by one step. Then, an aperture value (Av) and an exposure time (Tv) are calculated based on the Ev, in the CPU 31.

Further, under the control of the CPU 31, an aperture device 71 is adjusted based on the Av, the quick return mirror 3 (see FIG. 1) is to set to an up position, and then a shutter device 72 is driven at a predetermined speed, when the ON signal is input to the second input port PI2 after the release switch is turned to the ON position by pushing the shutter button 20 by two steps.

With reference to flowcharts indicated in FIGS. 5 through 10, an operation in the CPU 31, for correcting the focused image tremble caused by the hand tremble, will be explained.

When a power switch (omitted in FIGS. 1 and 4) is turned to the ON position, in step S100, the CPU 31 carries out an initializing operation, by which a digital variable V3a, a digital rotational displacement value of the vertical axis V4a, a digital variable V3b and a digital rotational displacement value of the horizontal axis V4b are respectively set to "0".

A direct-current component along the horizontal axis based on a null voltage output from the angular speed sensor 52 and a direct-current component along the horizontal axis based on a slow tremble of the camera are stored in the digital variable V3a. Note that, the direct-current component along the horizontal axis based on the null voltage output from the angular speed sensor 52 is an offset value of the detected signal of the hand tremble along the horizontal axis. A direct-current component along the vertical axis based on a null voltage output from the angular speed sensor 51 and a direct-current component along the vertical axis based on the slow tremble of the camera are stored in the digital variable V3b. Note that, the direct-current component along the vertical axis based on the null voltage output from the angular speed sensor 51 is an offset value of the detected signal of the hand tremble along the vertical axis.

In step S102, flags Fa and Eb are initialized to be set to "0". The flags Fa and Fb are used in a reverse check routine of a direction of a focused image tremble described below.

The value of the flag Fa indicates a number of performances of the reverse check routine when the focused image tremble along the horizontal axis is out of a range able to be corrected by the correction system 40. The value of the flag Fb indicates a number of performance of the reverse check routine when the focused image tremble along the vertical axis is out of a range able to be corrected by the correction system 40. When each flag is set to "0", the respective reverse check routine is performed at a first time. When each flag is set to "1", the respective reverse check routine has been already performed at least one time.

In steps S104, an A/D converting operation of the signals which are input into the A/D conversion ports AD1 and AD2 is performed. A hand tremble analog-detected-signal along the horizontal axis α, output from the angular speed sensor 52, is read through the A/D conversion port AD1, and the tremble analog-detected-signal is converted to a digital value, before being set to a digital-detected-variable of the horizontal axis V1a. Similarly, a hand tremble analog-detected-signal along the vertical axis β, output from the angular speed sensor 51, is read through the A/D conversion port AD2, and the tremble analog-detected-signal is converted to a digital value, before being set to a digital-detected-variable of the vertical axis V1b.

In step S106, an operation which removes influence of the direct-current components is performed. A digital variable V3a, which is the direct-current component, is subtracted from the digital-detected-variable V1a, so that an angular speed V2a along the horizontal axis is calculated. Also, a digital variable V3b, which is the direct-current component, is subtracted from the digital-detected-variable V1b, so that an angular speed V2b along the vertical axis is calculated.

In step S108, the angular speed V2a is divided by a first coefficient K1a, before being added to the digital variable V3a, so that the digital variable V3a is reset. Similarly, the angular speed V2b is divided by a first coefficient K1b, before being added to the digital variable V3b, so that the digital variable V3b is reset.

Then, in step S110, it is judged whether the photometry switch 21 is turned to the ON position. Unless the photometry switch 21 is ON, the process returns to step S104. In other words, while the photometry switch is in the OFF position, the procedures from step S104 through step S108 are repeatedly performed (loop performance). Namely, an operation equivalent to a function of a negative-feedback amplifier is performed. In this embodiment, the negative-feedback amplifier includes: a difference amplifier which gives the difference between the digital-detected-value V1a (V1b) and the digital variable V3a (V3b); and a high-pass filter which outputs the digital variable V3a (V3b) used for removing the direct-current component from the angular speed V2a (V2b).

As described above, the digital variables V3a and V3b are set to "0" at a first time performance, and the values recalculated in step S108 are respectively used for the digital variables V3a and V3b in the loop performance after the first time performance.

There is a situation in which the values of voltage output from the angular speed sensors 51 and 52 are not "0" due to the null voltage that is the direct-current component, even though a hand tremble does not occur. However, the direct-current component included in each value of output voltage from the angular speed sensors 51 and 52 becomes substantially equal to "0" by the above mentioned loop performance equivalent to the negative-feedback amplifier.

Usually, it takes a long time for the direct-current component to become equal to "0", from the time when the main power switch is turned ON till when the photometry switch is turned ON, for example, just after the power switch is turned ON, or after the camera is panned widely in one direction for choosing or changing a composition. Note that, in this embodiment, the first coefficients K1a and K1b are respectively set to relatively small values (smaller than second coefficients K2a and K2b as described below). Accordingly, in the above-mentioned situations, the time required for the direct-current component to become substantially equal to "0" is shortened. Consequently, it is prevented that a snapshot is unable to be taken just after the power switch is turned ON or after the camera is panned widely in one direction.

Figure 6:
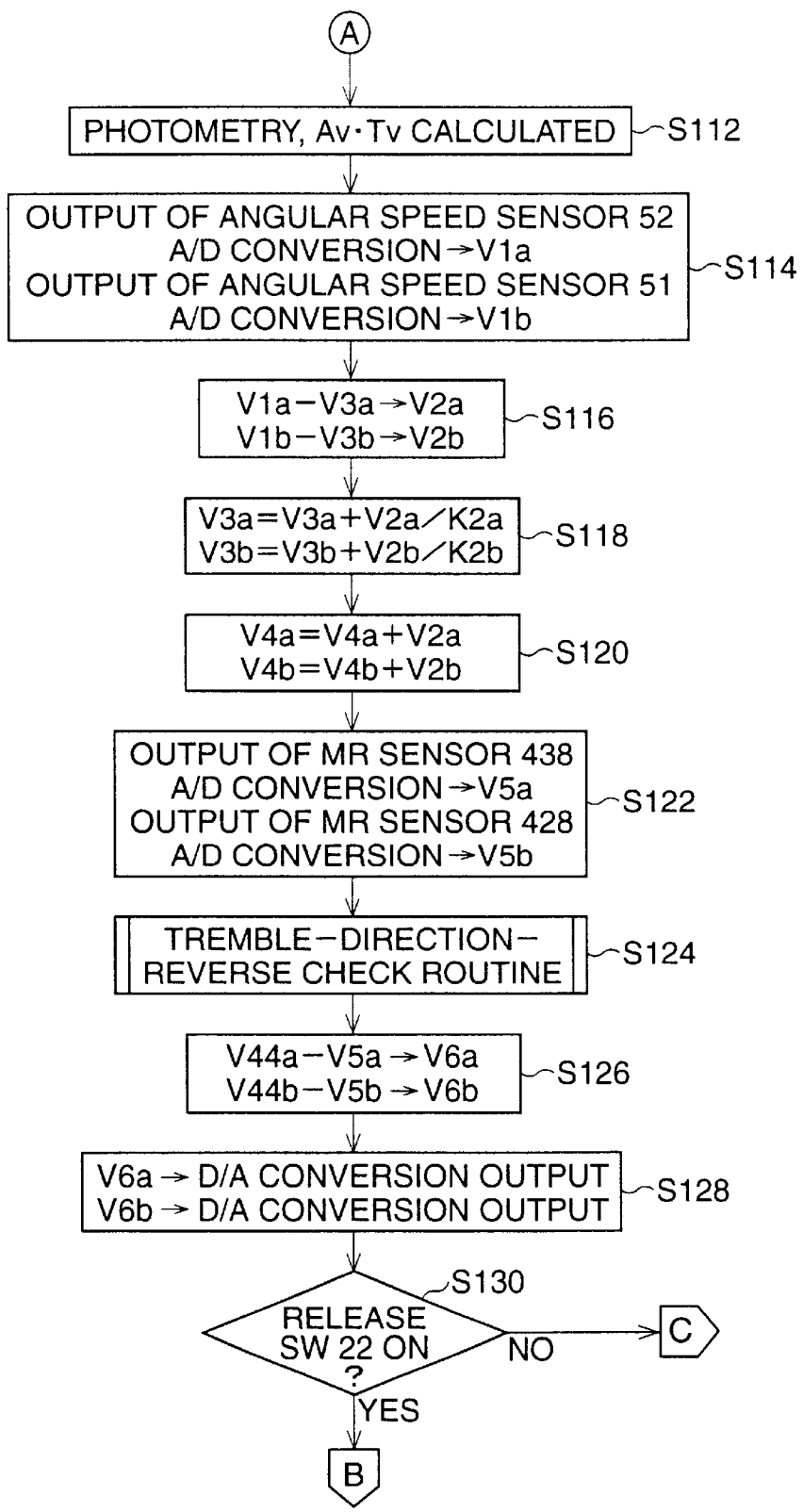

When the photometry switch 21 is turned to the ON position, the process goes to step S112 of FIG. 6. In step S112, the Ev (exposure value) is calculated by performing a photometry operation of the luminance reflected by the object through the photometry sensor 70 (see FIG. 4). Further, the Av and the Tv are calculated based on the Ev.

Subsequently, in step S114, the digital-detected-value along the horizontal axis V1a and the digital-detected-value along the vertical axis V1b are calculated similarly to the procedure of step S104, then the process goes to step S116.

In step S116, the operation similar to the operation of step S106 is performed. The digital variable V3a is subtracted from the digital-detected-variable V1a, so that the angular speed V2a along the horizontal axis is calculated. Also, the digital variable V3b is subtracted from the digital-detected-variable V1b, so that the angular speed V2b along the vertical axis is calculated.

Then, in step S118, the angular speed V2a is divided by the second coefficient K2a, before being added to the digital variable V3a, so that the digital variable V3a is reset. Similarly, the angular speed V2b is divided by the second coefficient K2b, before being added to the digital variable V3b, so that the digital variable V3b is reset. Consequently, the focused image tremble caused by a slow hand tremble is able to be corrected.

In step S120, a digital-rotational-displacement-value V4a, which defines the rotational displacement of the second rotating board 430 along the horizontal axis α, is calculated by integrating the angular speed of the horizontal axis V2a. Also, a digital-rotational-displacement-value V4b, which defines the rotational displacement of the first rotating board 420 along the vertical axis β, is calculated by integrating the angular speed of the vertical axis V2b.

Note that, in step S120, values, directly calculated by the integration of the angular speeds V2a and V2b, are respectively changed to the amounts of the focused image tremble on the image formation surface, to be set to the V4a and the V4b, reversing each direction component included in the angular speeds V2a and V2b (namely, the directions of the focused image tremble along the horizontal and vertical axes). Accordingly, the V4a and V4b calculated in step S120 have a function of correction of the focused image tremble on the image formation surface.

In step S122, an analog signal detected by the MR sensor 438 is read from the A/D conversion port AD3. The analog signal detected by the MR sensor 438 corresponds to a present position of the second rotating board 430. The analog signal of the MR sensor 438 is converted to a digital value, before being stored in a digital-present-position-value V5$a$ along the horizontal axis. Also, an analog signal detected by the MR sensor 428 is read from the A/D conversion port AD4. The analog signal detected by the MR sensor 428 corresponds to a present position of the first rotating board 420. The analog signal of the MR sensor 428 is converted to a digital value, before being stored in a digital-present-position-value V5$b$ along the vertical axis.

In step S124, a tremble-direction-reverse check routine is performed. In the reverse check routine, a driving value V44$a$ along the horizontal axis and a driving value V44$b$ along the vertical axis are calculated. Each driving value is respectively calculated in accordance with a displacement of the focused image tremble along each axis, in a situation in which the focused image tremble is out of the range able to be corrected by the correction system 40. Note that, the detail of the operation of the reverse check routine will be explained below.

In step S126, a digital-driving-value V6$a$ along the horizontal axis is calculated by subtracting the digital-present-position-value V5$a$ along the horizontal axis from the V4$a$. The V6$a$ is a driving value of the second rotating board 430 from the present position along the horizontal axis. Namely, the V6$a$ corresponds to a driving amount of the motor 435. Also, a digital-driving-value V6$b$ along the vertical axis is calculated by subtracting the digital-present-position-value V5$b$ along the vertical axis from the V4$b$. The V6$b$ is a driving value of the first rotating board 420 from the present position along the vertical axis. Namely, the V6$b$ corresponds to a driving amount of the motor 425.

Subsequently, in step S128, the digital-driving-value V6$a$ along the horizontal axis is converted to an analog driving signal, before outputting the analog driving signal from the first D/A conversion port DA1. Also, the digital-driving-value V6$b$ along the vertical axis is converted to an analog driving signal, before outputting the analog driving signal from the second D/A conversion port DA2.

Then, it is checked in step S130 whether the release switch 22 is turned to the ON position. Unless the release switch 22 is ON, the process returns to step S110 of FIG. 5, and the procedures of and after step S110 are repeatedly performed. Namely, the procedures from step S112 through step S128 are repeatedly performed, from after the photometry switch 21 is turned to the ON position till the release switch 22 is turned to the ON position.

Values which have been calculated and stored in the digital variables V3$a$ and V3$b$ in step S108, are used as variables of V3$a$ and V3$b$, at the first time performance of the procedure of steps S116 and S118. Namely, the direct-current component of the null voltage and so on has been removed from each voltage output from the angular speed sensors 51 and 52. On the other hand, in this embodiment, the second coefficients K2$a$ and K2$b$ are respectively set to relatively large values (respectively larger than the first coefficients K1$a$ and K1$b$). Accordingly, in the above-mentioned high-pass filters, with respect to filtering of the digital-detected values V1$a$ and V1$b$, each pass band of the V1$a$ and V1$b$ includes a low frequency band. As described above, in step S116, the angular speed value V2$a$, from which the direct-current component, due to the null voltage, is removed, is calculated by subtracting the digital variable V3$a$ from the digital-detected values V1$a$, and similarly, the angular speed value V2$b$, from which the direct-current component, due to the null voltage, is removed, is calculated by subtracting the digital variable V3$b$ from the digital-detected values V1$b$. Accordingly, the angular speed value V2$a$ (V2$b$) accurately corresponds to the real output of the angular speed sensor 52 (51), including the hand tremble of high frequency and the hand tremble of low speed. Namely, the angular speed values V2$a$ and V2$b$ accurately represent the directions and the amounts of the hand tremble.

Figure 9:
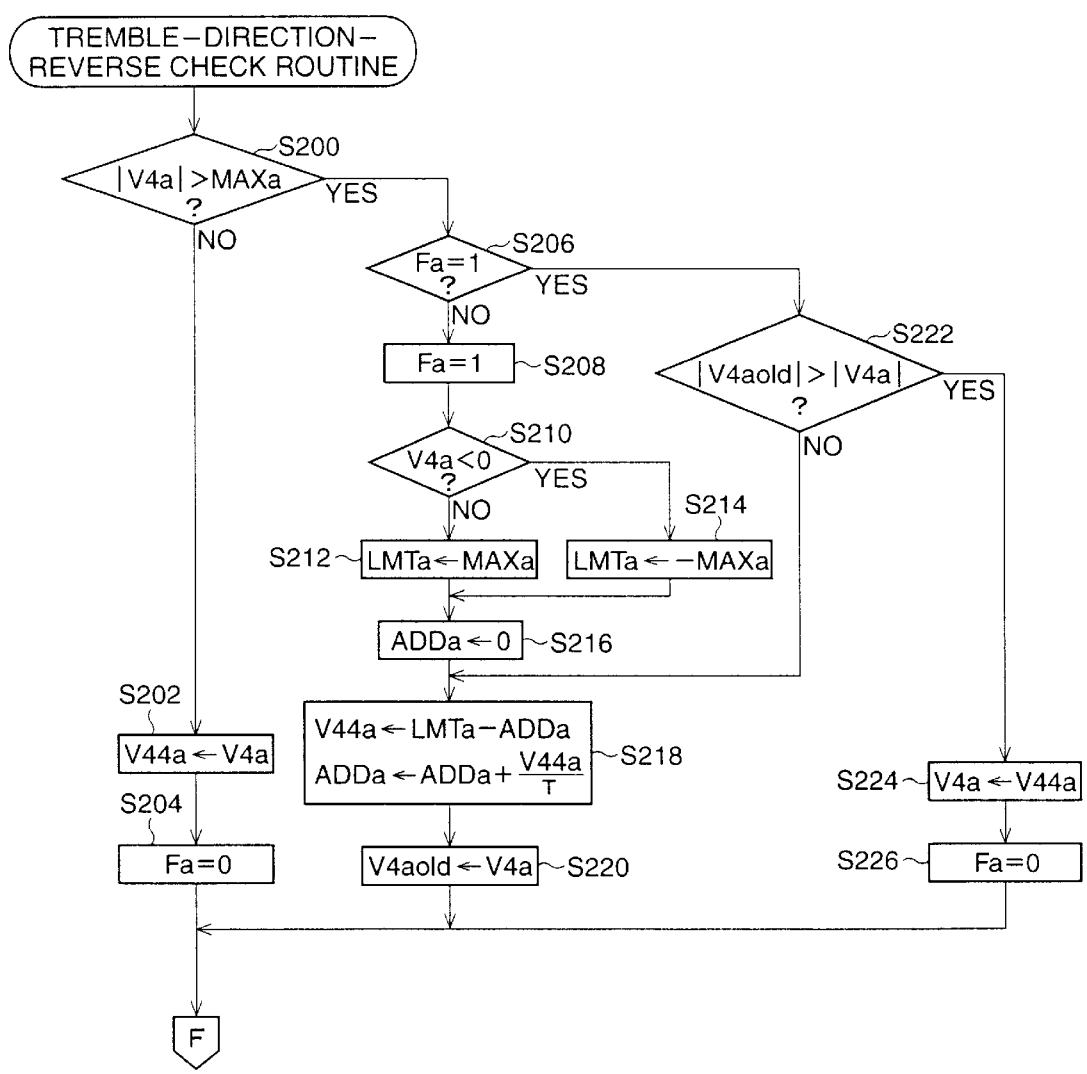
FIG. 9 is a part of a flowchart indicating procedures of a reverse checking routine of a direction in FIG. 6 of the focused image tremble, with respect to the horizontal axis, of the first embodiment.
Figure 10:
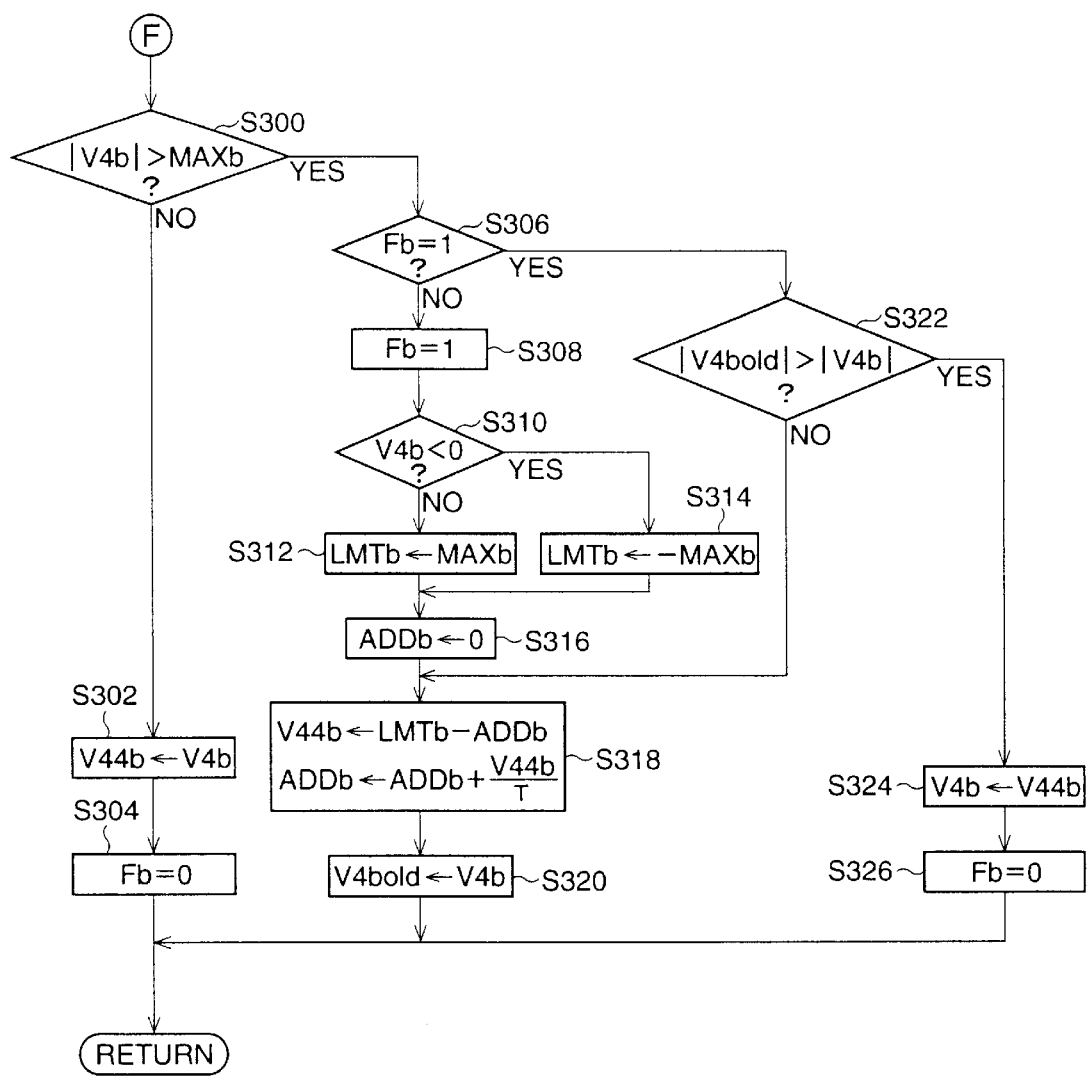
FIG. 10 is the remaining part of the flowchart indicating the procedures of the reverse checking routine of the direction of the focused image tremble, with respect to the vertical axis, of the first embodiment.

The procedures of the tremble-direction-reverse check routine of a direction of the focused image tremble will be explained with reference to FIGS. 9 and 10. FIG. 9 indicates the procedures with respect to the focused image tremble along the horizontal axis. FIG. 10 indicates the procedures with respect to the focused image tremble along the vertical axis.

In step S200, it is checked whether the absolute value of the digital-rotational-displacement-value V4$a$ along the horizontal axis exceeds a correctable range MAXa. The correctable range MAXa corresponds to a distance between a standard position and a limit position of driving the correction lens 401 in one direction along the horizontal axis. Namely, the correctable range MAXa corresponds to a limit range of the driving the correction lens 401 is in one direction along the horizontal axis. Note that, when the correction lens 401 is positioned at the standard position, the optical axis of the correction lens 401 is coaxial with the optical axis of the other optical systems 2. Further, there is a possibility of each member of the correction system 40 receiving an extra load and being damaged, when the members touch each other. Accordingly, the limit range is defined to be smaller by a predetermined amount than a maximum range, in which the correction lens 401 is able to be driven in one direction along the horizontal axis, defined by the mechanical structure of the members of the correction system 40.

Therefore, it is able to be judged whether the focused image tremble occurs within a correctable range by the correction lens 401, by comparing the absolute value of the V4$a$ and the correctable range MAXa. When the absolute value of the V4$a$ exceeds the correctable range MAXa, a focused image tremble, which is unable to be corrected by the correction lens 401, occurs along the horizontal axis. When the absolute value of the V4$a$ is smaller than the correctable range MAXa, it indicates that a focused image tremble along the horizontal axis occurs within a range able to be corrected by the correction lens 401. If it is judged that the V4$a$ is not larger than the MAXa, the process goes to step S202.

In step S202, the value of the V4$a$ is stored in the driving value V44$a$. Subsequently, as this routine is being performed in a situation in which the focused image tremble occurs within the correctable range, the flag Fa is set to "0" in step S204. Then, the process goes to the procedures with respect to the focused image tremble along the vertical axis, indicated in FIG. 10.

On the other hand, if it is confirmed that the absolute of the V4$a$ exceeds the correctable range MAXa, the process goes to step S206. In step S206, the value of the flag F1 is checked. As described above, the flag F1 is initially set to "0", and when the absolute value of the V4$a$ does not exceed the MAXa, the flag F1 is set to "0". Accordingly, if it is judged in step S206 that the value of the flag F1 is "1", it indicates that this routine has been already performed at least one time in the situation in which the focused image tremble along the horizontal axis is out of the correctable range. Namely, procedures from step S208 through step S220, described below, have been already performed once.

If it is judged in step S206 that the value of the flag F1 is "0", the performance of this routine is the first time after the focused image tremble along the horizontal axis became beyond the correctable range MAXa. If the value of the flag Fa is "0", the process goes to step S208. In step S208, the flag Fa is set to "1", for the next performance of this routine in the situation in which the focused image tremble along the horizontal axis is beyond the correctable range.

Subsequently, a sign of the V4a is checked in step S210. Steps S212 and S214 are performed according to the sign. In steps S212 and S214, the value of the MAXa with the sign is stored in a limit value LMTa. The limit value LMTa is used for removing the direct-current component from a boundary value of the correctable range. The removal of the direct-current component is described below. In step S216, a variable ADDa is initialized to be set to "0", then the process goes to step S218. The variable ADDa is used for the removal of the direct-current.

In step S218, the procedure of removing the direct-current from the boundary value of the correctable range is performed. A value, obtained by subtracting the variable ADDa from the limit value LMTa, is stored in the driving value V44a. The ADDa is recalculated by adding a value, obtained by dividing the ADDa by a time constant T, to reset the ADDa. When the performance of this routine is the first time after the focused image tremble along the horizontal axis became beyond the correctable range MAXa, the ADDa is set to "0" in step S216, so that the value of the limit value LMTa is stored in the driving value V44a.

The time constant T is set so that the correction lens 401, which is driven based on the value of the V44a changed in accordance with the repeated performance of the procedure of step S218, is driven from the boundary of the correctable range to the standard position in approximately 5 seconds. Namely, if the tremble-direction-reverse check routine is performed each one millisecond, the time constant T is set to "5000". From the time at which the focused image tremble becomes beyond the correctable range till the time at which the direction of the focused image tremble is reversed, the procedure of step S218 is repeatedly performed. Accordingly, the correction lens 401 gradually approaches the standard position. If the direction of the focused image tremble is not reversed after 5 seconds, the correction lens 401 is stopped at the standard position.

In step S220, the value of the V4a is stored in a variable V4a old for the next performance of this routine, then the process goes to the procedures with respect to the vertical axis.

On the other hand, in step S206, if it is confirmed that the value of the flag Fa is "1" and this routine has already been performed at least one time in the situation in which the focused image tremble is out of the correctable range, the process goes to step S222. In step S222, the absolute value of the V4a old and the absolute value of the V4a at the present time are compared. As described above, the value of the V4a was stored in the V4a old when this routine was previously performed. Accordingly, when the absolute value of the V4a old is larger than the absolute value of the present V4a, it indicates that the direction of the focused image tremble is reversed after the focused image tremble becomes beyond the correctable range.

If it is confirmed in step S222 that the direction of the focused image tremble is reversed, the process goes to step S224. The value of the V44a is copied to the V4a in step S224, the flag Fa is set to "0" in step S226, and then the process goes to the procedures with respect to the vertical axis.

On the other hand, if it is confirmed in step S222 that the absolute value of the V4a old is not larger than the absolute value of the V4a, it indicates that the focused image tremble changes from the boundary of the correctable range to a direction opposite to the standard position after the focused image tremble becomes beyond the correctable range. In this case, the process goes to step S218. The procedure of removing the direct-current from the boundary value of the correctable range is performed, and the driving of the correction lens 401 is restarted.

Figure 11:
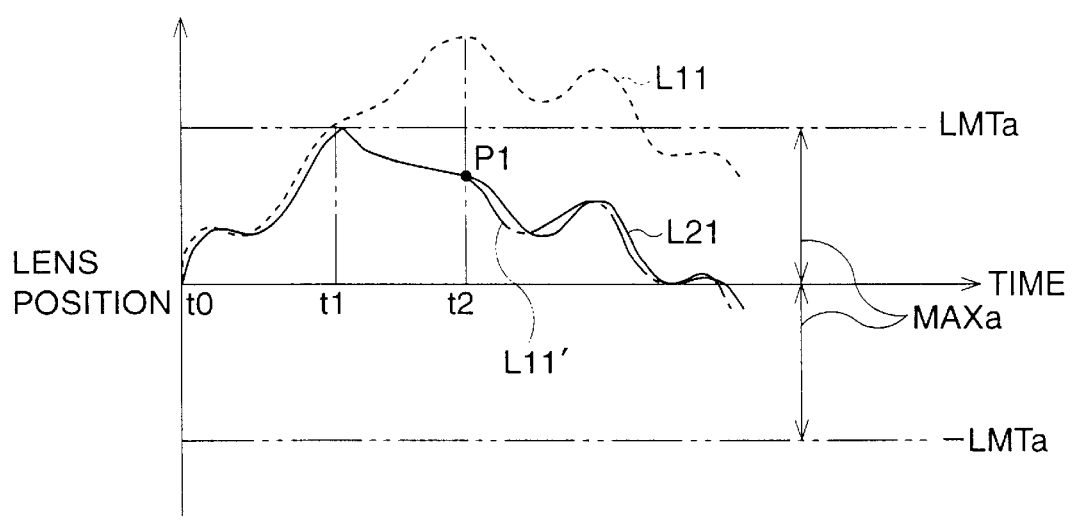
FIG. 11 is a graph showing a curve of the focused image tremble and a displacement of a correction optical system due to the first embodiment.

An effect of this routine will be explained with reference to FIG. 11. In FIG. 11, a broken line L11 represents a waveform corresponding to the focused image tremble. Namely, the broken line L11 represents a change by which the correction lens 401 should be moved in order to cancel the focused image tremble. A solid line L21 represents a displacement of the correction lens 401. From t0 to t1, the focused image tremble occurs within the correctable range (MAXa). Accordingly, after the procedure of step S202 of the tremble-direction-reverse check routine of FIG. 9 is performed, the procedures of steps S126 and S128 are performed. Consequently, the correction lens 401 is driven in such a manner that the focused image tremble is canceled, so that the solid line L21 changes following the broken line L11.

The focused image tremble becomes beyond the correctable range at t1. From t1 to t2, the focused image tremble continues changing to a direction opposite to the standard position. Accordingly, from t1 to t2, the procedure of step S218 of the tremble-direction-reverse check routine of FIG. 9 and the procedures of step S126, S128 of FIG. 6 are repeatedly performed. Consequently, the correction lens 401 is driven in a direction from the boundary of the correctable range to the standard position, as the solid line L21 indicates.

The direction of the focused image tremble is reversed at t2, as the broken line L11 indicates. Accordingly, after the procedure of step S224 of the tremble-direction-reverse check routine of FIG. 9 is performed, the procedures of steps S126, S128 of FIG. 6 are performed. By performing the procedure of step S224, rather than the practical displacement value of the focused image tremble, the value of V44a calculated in step S218 at the previous performance of this routine is stored in the V4a.

Namely, it is supposed that the focused image tremble is changed to a point P1 at t2, so that it is judged at the next performance of this routine that the focused image tremble is within the correctable range. The real focused image tremble from t2 indicated by the broken line L11 is supposed to change within the correctable range as shown by a L11, by the performance of the procedures from step S114 through step S120 of FIG. 6. Further, by the performance of the procedure of step S202 of FIG. 9, the correction lens 401 is driven following the focused image tremble within the correctable range, as shown by the solid line L21.

According to the first embodiment, while the focused image tremble is unable to be corrected, and exceeds the correctable range, the correction lens 401 is driven to approach the standard position, so that the correction lens 401 is movable. Therefore, the correction of the focused image tremble can be carried out by driving the correction lens 401, soon after the direction of the focused image tremble is reversed.

In the tremble-direction-check routine of the vertical axis indicated in FIG. 10, the procedures are performed similarly to the routine of the horizontal axis.

By checking the values of the digital-rotational-displacement-value V4b and the flag Fb, it is judged whether the focused image tremble along the vertical axis exceeds a correctable range MAXb, and whether the performance of this routine is a first time or this routine has already been performed at least one time (steps S300, S306).

If the focused image tremble along the vertical axis is within the correctable range MAXb, a driving value V44b is set so that the correction lens 401 is able to be driven following the focused image tremble (S302).

If the focused image tremble along the vertical axis is beyond the correctable range MAXb, the driving value V44b is calculated so that the correction lens 401 is driven to approach the standard position along the vertical axis (S318), till the direction of the focused image tremble along the vertical axis is reversed. If the direction of the focused image tremble is reversed, the value of the V44b is copied to the V4b (S324), so that the correction lens 401 is driven following the focused image tremble after the focused image tremble is supposed to be displaced within the correctable range.

Note that, the correctable range MAXb corresponds to a distance between the standard position and a limit position of driving the correction lens 401 in one direction along the vertical axis, similarly to the MAXa. Further, similar to the limit range of the horizontal axis, the limit range of the vertical axis is defined to be smaller by a predetermined amount than a maximum range, in which the correction lens 401 is able to be driven in one direction along the vertical axis, defined by the mechanical structure of the members of the correction system 40, considering that there is a possibility of each member of the correction system 40 receiving an extra load and being damaged, when the members touch each other.

Figure 7:
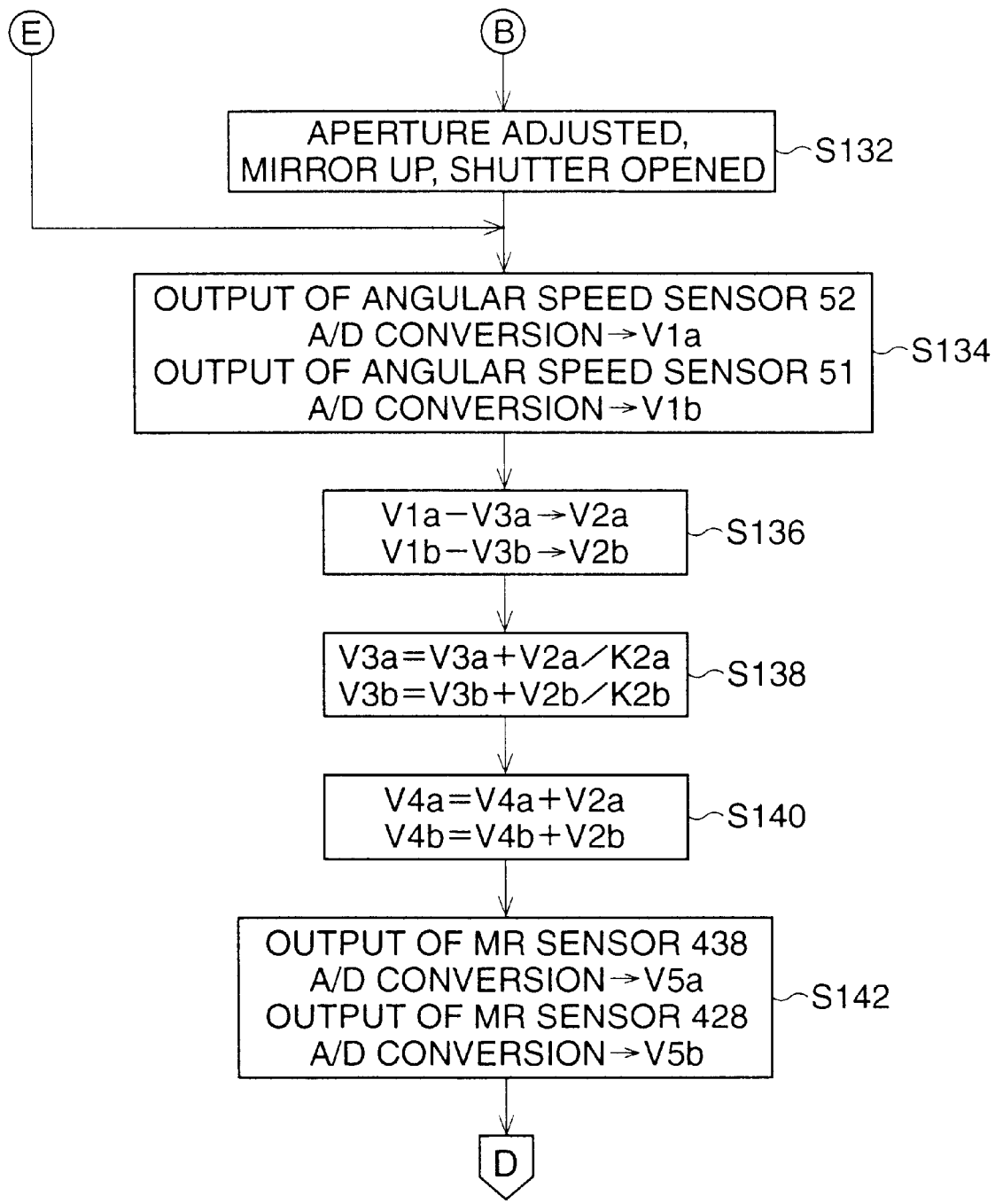
FIG. 7 is a flowchart indicating a first half of procedures of an exposure time of the camera controlling sequence of the first embodiment.

If it is confirmed in step S130 of FIG. 6 that the release switch 22 is turned to the ON position, the process goes to step S132 of FIG. 7. Note that, if the photometry switch 21 is turned to the OFF position before the release switch 22 is turned to the ON position, the above-mentioned loop performance from step S104 to step S108 is repeated.

If the release switch 22 is turned to the ON position, in step S132 of FIG. 7, the aperture device 71 (see FIG. 4) is driven such that the opening degree of the aperture is adjusted based on the above-mentioned Av, the quick return mirror 3 is set to the up position, and the shutter device 72 (see FIG. 4) is driven to be opened at the predetermined speed.

In step S134, similarly to steps S104 and S114, the digital-detected-value of the horizontal axis V1a and the digital-detected-value of the vertical axis V1b are calculated. Subsequently, procedures similar to the procedures from step S116 through step S120 are performed, from step S136 through step S140. The digital variable V3a representing the direct-current component is subtracted from the digital-detected-value V1a, and the digital variable V3b representing the direct-current component is subtracted from the digital-detected-value V1b (S136). The angular speed V2a is divided by the second coefficient K2a, before being added to the digital variable V3a, so that the digital variable V3a is reset, and the angular speed V2b is divided by the second coefficient K2b, before being added to the digital variable V3b, so that the digital variable V3b is reset (S138). Then the V4a and the V4b are calculated, by integrating the V2a and the V2b (S140).

In step S142, similarly to step S122, the analog signal detected by the MR sensor 438, which corresponds to the present position of the second rotating board 430 along the horizontal axis, is read from the A/D conversion port AD3. The analog signal of the MR sensor 438 is converted to a digital value, before being stored in the digital-present-position-value V5a along the horizontal axis. Also, the analog signal detected by the MR sensor 428, which corresponds to the present position of the first rotating board 420 along the vertical axis, is read from the A/D conversion port AD4. The analog signal of the MR sensor 428 is converted to a digital value, before being stored in the digital-present-position-value V5b along the horizontal axis.

Figure 8:
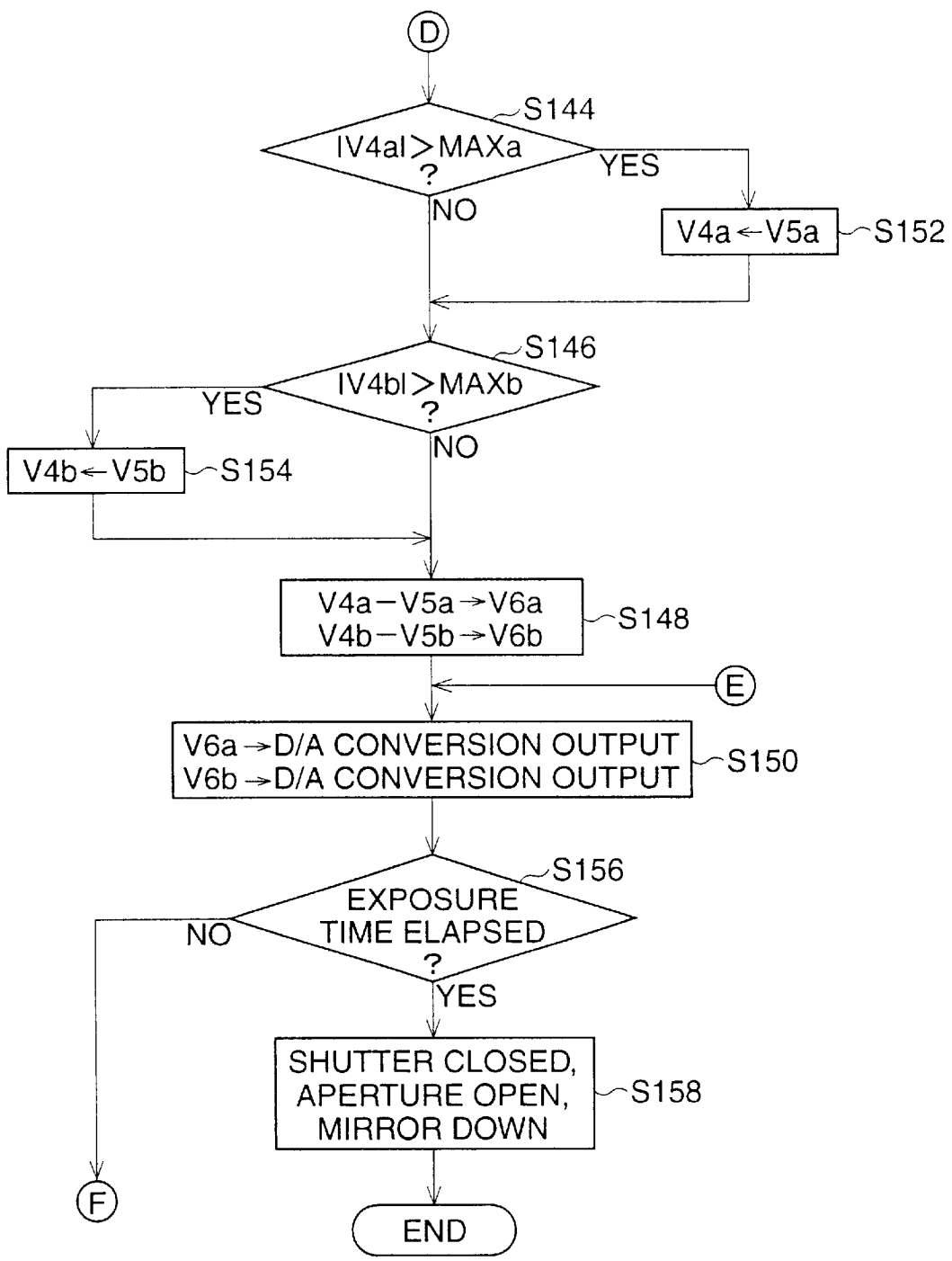
FIG. 8 is a flowchart indicating a latter half of the procedures of the exposure time of the camera controlling sequence of the first embodiment.

Then, the process goes to step S144 of FIG. 8. In step S144, it is checked whether the V4a, the rotational-displacement-value of the second rotating board 430 along the horizontal axis, exceeds the correctable range MAXa along the horizontal axis. If the V4a is within the correctable range MAXa, the process goes to step S146.

In step S146, it is checked whether the V4b, the rotational-displacement-value of the first rotating board 420 along the vertical axis, exceeds the correctable range MAXb along the vertical axis. If the V4b is within the correctable range MAXb, the process goes to step S148.

In step S148, a digital-driving-value along the horizontal axis V6a is calculated by subtracting the digital-present-position-value V5a along the horizontal axis from the V4a. The V6a is a driving value of the second rotating board 430 from the present position along the horizontal axis. Namely, the V6a corresponds to a driving amount of the motor 435. Also, a digital-driving-value along V6b the vertical axis is calculated by subtracting the digital-present-position-value along the vertical axis V5b from the V4b. The V6b is a driving value of the first rotating board 420 from the present position along the vertical axis. Namely, the V6b corresponds to a driving amount of the motor 425.

Subsequently, in step S150, the digital-driving-value 6a along the horizontal axis is converted to an analog driving signal, before outputting the analog driving signal from the first D/A conversion port DA1. Also, the digital-driving-value V6b along the vertical axis is converted to an analog driving signal, before outputting the analog driving signal from the second D/A conversion port DA2.

The analog driving signal (corresponding to the V6a), output from the first D/A conversion port DA1, is output to the motor 435, after being amplified by the motor driving circuit 462. The motor 435 drives the second rotating board 430 based on the analog driving signal. Accordingly, the correction lens 401 is driven along the horizontal axis a so that the horizontal axis component of the focused image tremble due to the hand tremble can be canceled.

The analog driving signal (corresponding to the V6b), output from the second D/A conversion port DA2, is output to the motor 425, after being amplified by the motor driving circuit 461. The motor 425 drives the first rotating board 420 based on the analog driving signal. Accordingly, the correction lens 401 is driven along the vertical axis β so that the vertical axis component of the focused image tremble due to the hand tremble can be canceled.

If it is judged in step S144 that the V4a exceeds the correctable range MAXa, namely if it is judged that the V4a is out of the MAXa, the process goes to step S152. In step S152, the value of the V5a calculated in step S142 is copied to the V4a.

Accordingly, the digital-rotational-driving-value V6a is set to "0" in step S148, so that the driving of the first motor 435 is stopped by the procedure of step S150, and the correction lens 401 is stopped in the horizontal axis.

If it is judged in step S146 that the V4b exceeds the correctable range MAXb, namely if it is judged that the V4b is out of the MAXb, the process goes to step S154. In step S154, the value of the V5b calculated in step S142 is copied to the V4b.

Accordingly, the digital-rotational-driving-value V6b is set to "0" in step S148, so that the driving of the second motor 425 is stopped by the procedure of step S150, and the correction lens 401 is stopped in the vertical axis.

Namely, the correction lens 401 is stopped at the present position.

In step S156, it is judged whether the exposure time, calculated in step S114, has elapsed, after the analog driving signals (V6a, V6b) are output from the first and second D/A conversion ports DA1, DA2 in step S150. If the exposure time has not yet elapsed, the process returns to step S134 and the procedures thereafter are repeated, so that the driving control of the first and second motors 435, 425 is carried out for correcting the focused image tremble. On the other hand, if it is judged that the exposure time has elapsed, the process goes to step S158. In step S158, the shutter device 72 is closed, the quick return mirror 3 is reset to the down position, and the aperture device 71 is driven to the fully open position, then the photographing operation is ended.

Figure 12:
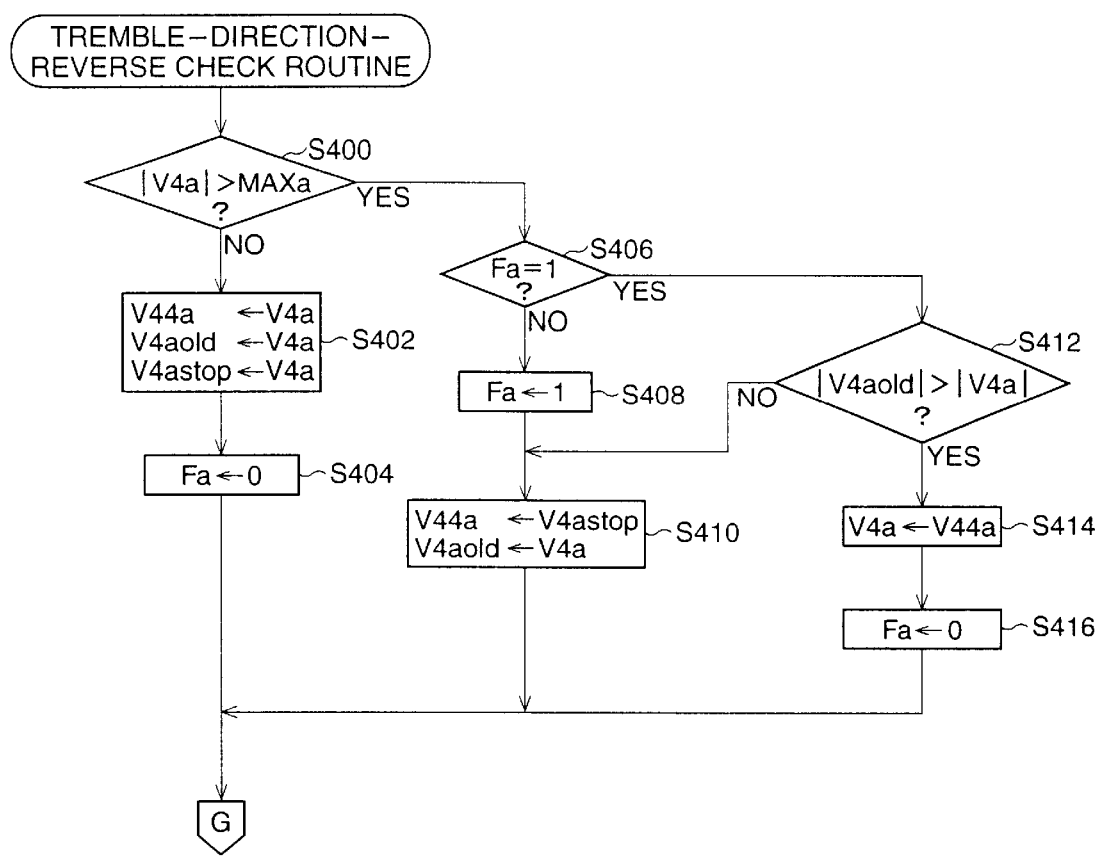
FIG. 12 is a flowchart indicating procedures of a reverse checking routine of a direction of the focused image tremble along the horizontal axis, in a second embodiment.
Figure 13:
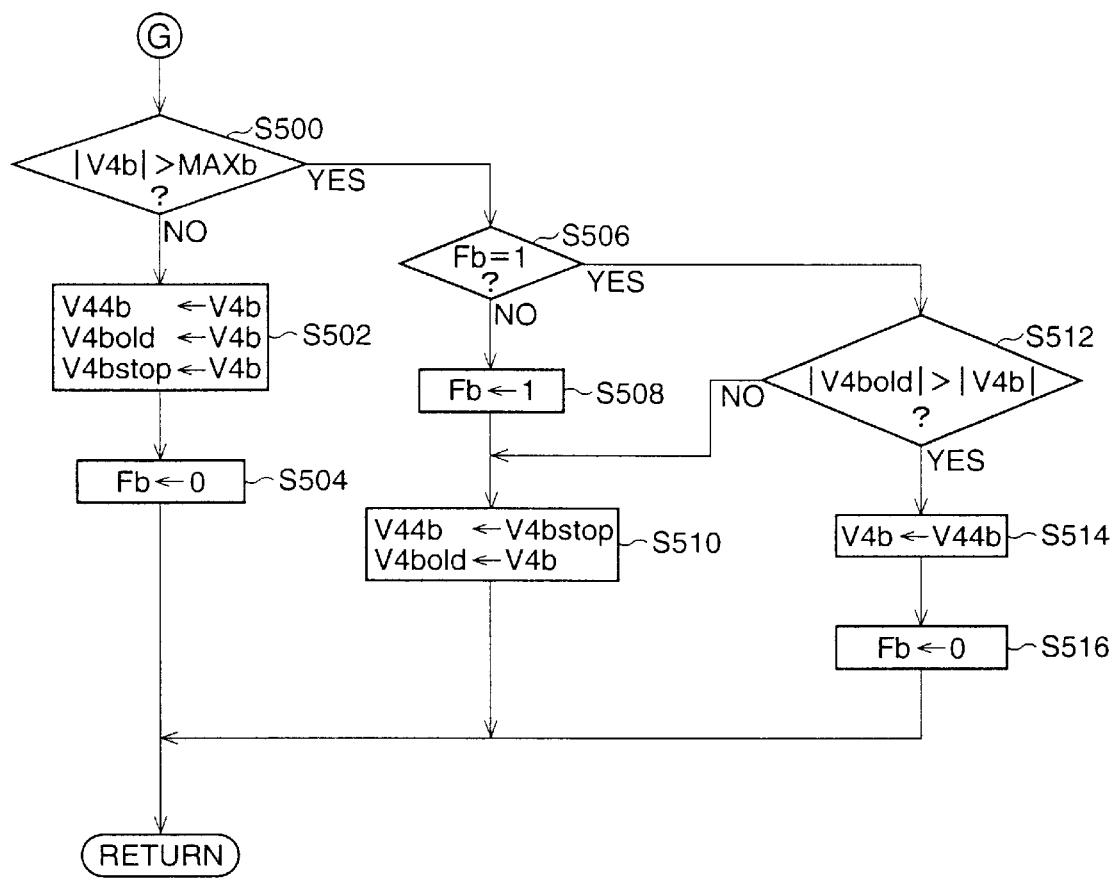
FIG. 13 is a flowchart indicating procedures of a reverse checking routine of a direction of the focused image tremble along the vertical axis, in the second embodiment.

FIGS. 12, 13 indicate flowcharts of procedures of a focused-image-tremble-reverse check routine, a second embodiment according to the present invention. The second embodiment is applied to the camera to which the first embodiment is applied. In the second embodiment, after the power switch is turned ON, a controlling sequence similar to the controlling sequence of the first embodiment indicated in FIGS. 5 through 8 is carried out. In step S124 of FIG. 6, the check routine of FIGS. 12 and 13 are performed. In the check routine of the second embodiment, the correction lens 401 is not driven to approach the standard position, when the focused image tremble exceeds the correctable range. In such a situation, the correction lens 401 is stopped at a position at which the correction lens is positioned immediately before the focused image tremble becomes beyond the correctable range, as described below.

After the tremble-direction-reverse check routine is invoked in step S124 of FIG. 6, in step S400 of FIG. 12, it is checked whether the absolute value of the digital-rotational-displacement-value V4a exceeds the correctable range MAXa. If it is confirmed that the absolute value of the V4a is not larger than the MAXa and the focused image tremble along the horizontal axis is able to be corrected by driving the correction lens 401, the process goes to step S402.

In step S402, the value of the V4a is copied to a driving value V44a, and variables V4aold and V4astop. The value of the V44a, at a moment immediately before the focused image tremble becomes beyond the correctable range, is stored in the variable V4asop. The V4astop is used in the performance of this routine when the focused image tremble is out of the correctable range. Subsequently, in step S404, the flag Fa is set to "0", as the focused image tremble is within the correctable range of the correction lens 401.

On the other hand, if it is confirmed that the absolute value of the V4a exceeds the correctable range MAXa and the focused image tremble along the horizontal axis, which is not correctable by the correction lens 401, occurs, the process goes to step S406. In step S406, the value of the flag Fa is checked. If it is confirmed that the flag Fa is set to "0", namely if it is confirmed that the performance of this routine is a first time after the focused image tremble becomes beyond the correctable range, the process goes to S408. In step S408, the flag Fa is set to "1", for the next performance of this routine in a situation that the focused image tremble is out of the correctable range.

Subsequently, in step S410, the value stored in the variable V4astop is copied to the driving value V44a, and the value of the V4a is copied to the V4aold. Accordingly, the V44a is set to a value equal to the value of the V44a at the moment that this routine was previously performed. Therefore, when the procedures from step S126 through step S128 are performed after this routine, the correction lens 401 is stopped at the position to which the correction lens 401 is driven immediately before the focused image tremble along the horizontal axis becomes beyond the correctable range.

In step S406, if it is confirmed that the value of the flag Fa is "1" and this routine has been already performed at least one time in the situation that the focused image tremble along the horizontal axis is beyond the correctable range, the process goes to step S412. In step S412, the absolute value of the V4aold and the absolute value of the V4a at the present time are compared. The value of the V4a at the moment that this routine was previously performed, is stored in the V4a old, as described above. Accordingly, if the absolute value of the V4aold is larger than the absolute value of the V4a in step S142, it indicates that the direction of the focused image tremble is reversed after the focused image tremble becomes out of the correctable range.

If it is confirmed in step S412 that the direction of the focused image tremble is reversed, the process goes to step S414. In step S414, the value of the driving value V44a is copied to the V4a. Subsequently, in step S416, the flag Fa is set to "0", and then the process goes to the check routine of the vertical axis of FIG. 13.

On the other hand, if the absolute value of the V4aold is not larger than the value of the V4a in step S412, it indicates that the focused image tremble is moved in a direction opposite to the standard position after the focused image tremble becomes beyond the correctable range. In this case, the procedure of step S410 is performed, for stopping the correction lens 401 at a position to which the correction lens 401 is driven immediately before focused image tremble along the horizontal axis becomes beyond the correctable range.

Figure 14:
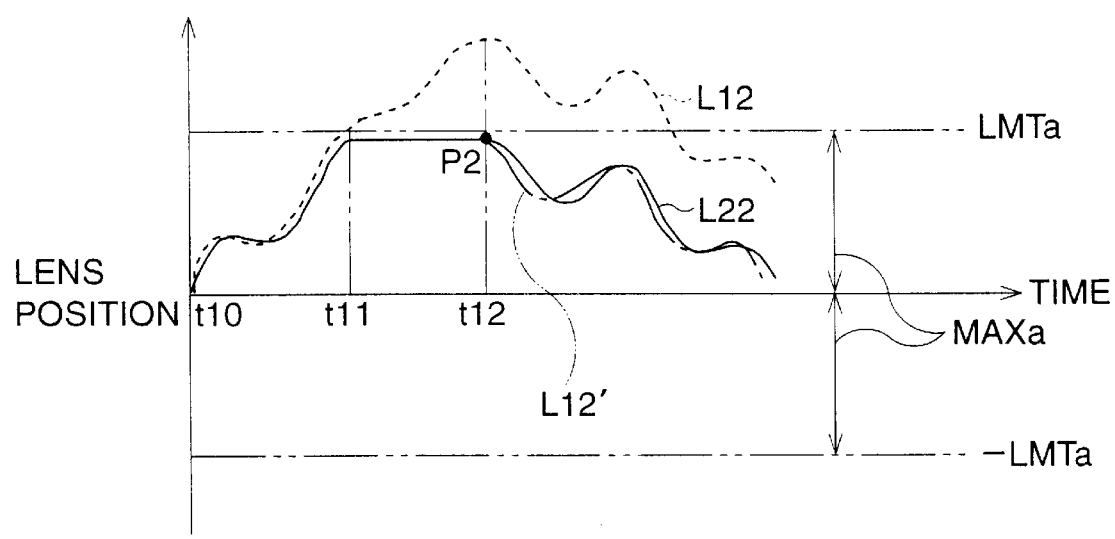
FIG. 14 is a graph showing a curve of the focused image tremble and a displacement of the correction optical system due to the second embodiment.

An effect of the second embodiment will be explained with reference to FIG. 14. In FIG. 14, a broken line L12 indicates a waveform corresponding to the focused image tremble along the horizontal axis. Namely, the broken line L12 represents a change by which the correction lens 401 should be driven in order to cancel the focused image tremble. A solid line L22 indicates a change of the correction lens 401 along the horizontal axis. From t10 to t11, the focused image tremble changes within the correctable range. Accordingly, after the procedure of step S402 of the tremble-direction-reverse check routine of FIG. 12 is performed, the procedures of steps S126, S128 are repeatedly performed. Consequently, the correction lens 401 is driven so that the focused image tremble is canceled, and the solid line L22 changes following the broken line L12.

At t11, the focused image tremble exceeds the correctable range. From t11 to t12, the focused image tremble changes in a opposite direction to the standard position from the boundary of the correctable range. Accordingly, from t11 to t12, the procedure of step S410 of the tremble-direction-reverse check routine of FIG. 12, and the procedures of steps S126, S128 are repeatedly performed. Consequently, the correction lens 401 is stopped at the position to which the correction lens 401 is driven immediately before the focused image tremble exceeds the correctable range, as shown by the solid line L22.

The direction of the focused image tremble is reversed at t12, as shown by the broken line L12. Accordingly, after the procedure of step S414 of the tremble-direction-reverse check routine of FIG. 12 is performed, the procedures of steps S126, S128 of FIG. 6 are performed. By the performance of the procedure of step S414, rather than the practical displacement value of the focused image tremble, the value of the driving V44a is stored in the V4a. Further, when this routine was previously performed, the value of the Vastop was copied to the V44a. Accordingly, it is supposed that the focused image tremble is displaced to a point P12 at t12, so that it is judged at the next performance of this routine that the focused image tremble is within the correctable range. The real focused image tremble from t12 indicated by the broken line L12 is supposed to be displaced within the correctable range as shown by a L12', by the performance of the procedures from step S114 through step S120 of FIG. 6. Further, by the performance of the procedure of step S402 of FIG. 12, the correction lens 401 is driven following the focused image tremble within the correctable range, as shown the solid line L22.

In the tremble-direction-check routine of the vertical axis indicated in FIG. 13, the procedures are performed similarly to the routine of the horizontal axis.

By checking the values of the digital-rotational-displacement-value V4b and the flag Fb, it is judged whether the focused image tremble along the vertical axis exceeds a correctable range MAXb, and whether the performance of this routine is a first time or this routine has already been performed at least one time (steps S500, S506).

If the focused image tremble along the vertical axis is within the correctable range MAXb, a driving value V44b is set so that the correction lens 401 is able to be driven following the focused image tremble (S502).

If the focused image tremble along the vertical axis is beyond the correctable range MAXb, the correction lens 401 is stopped in the vertical axis (S501), till the direction of the focused image tremble is reversed. If the direction of the focused image tremble along the vertical axis is reversed, the value of the V44b is copied to the V4b (S514), so that the correction lens 401 is restarted to be driven following the focused image tremble after the focused image tremble is supposed to be displaced to the position corresponding to the value of the V44a.

As described above, according to the first and second embodiments, when the direction of the focused image tremble is reversed, the driving of the correction lens 401 for following the focused image tremble is restarted. Accordingly, the time required, from after the focused image tremble becomes beyond the correctable range till the time when the correction of the focused image tremble is obtained, is shortened, so that greater clarity of the object image viewed in the finder view is achieved.

Further, according to the first embodiment, the operation, in which the correction lens 401 is driven to approach the standard position by the predetermined time constant, is carried out, from the time at which the focused image tremble becomes beyond the correctable range till the time at which the direction of the focused image tremble is reversed. Accordingly, when the direction of the focused image tremble is reversed and the driving of the correction lens 401 follows the focused image tremble, the correction lens 401 is positioned to be movable in some degree. Therefore, the correction lens 401 is able to follow the focused image tremble after the direction of the focused image tremble is reversed, even if the focused image tremble changes in the direction opposite to the standard position.

The first and second embodiment are applied to the camera which is provided with film as a photographing media. The above-mentioned correction of the focused image tremble is carried out during the photometry period, from the time after which the photometry switch 21 is turned to the ON position till the time at which the release switch 22 is turned to the ON position. However, the first and second embodiments can be applied to a digital camera in which an object image is subjected to photoelectric conversion of an image sensor, for example a CCD sensor and so on, to be recorded. In a digital camera, the above mentioned correction of the focused image tremble is carried out, while the accumulation of the charge corresponding to the object image is not being performed, namely while a shuttering operation (in other words, an image capturing operation) is not being carried out.

Further, the first and second embodiments are explained using the single lens reflex camera. Of course, the correcting operation according to these embodiments can be carried out in other optical devices, for example a pair of binoculars which are provided with telephoto optical systems. However, it is preferable to apply the correcting operation of these embodiments to photographing devices which capture an image, for example, a camera or a video camera.

As described above, according to the present invention, the correcting device of the focused image tremble, in which the correction is restarted in a short time after the focused image tremble becomes beyond the correctable range, is obtained.

The present disclosure relates to subject matters contained in the following Japanese Patent Application No.11-104097 (filed on Apr. 12, 1999), which is expressly incorporated herein, by reference, in its entirety.

What is claimed is:

1. A device for correcting a tremble of a focused image comprising:

a tremble detector that detects a tremble of optical axes of an optical device;

correction optical systems that correct said tremble of said optical axes;

driving devices that drive said correction optical systems;

a controlling system that controls said driving devices such that said correction optical systems are driven following said tremble of said optical axes in order to cancel a focused image tremble of an object due to said tremble of said optical axes;

wherein said controlling system controls said driving devices such that:

when said tremble of said optical axes becomes beyond a correctable range of said correction optical systems, said correction optical systems are stopped from being driven following said tremble of said optical axes;

when a direction of said tremble of said optical axes is reversed in a situation that said tremble of said optical axes is out of said correctable range, said correction optical systems are restarted, after having been stopped, to be driven following said tremble of said optical axes; and when said tremble of said optical axes becomes beyond said correctable range till a time at which said direction of said tremble of said optical axes is reversed, said correction optical systems approach a standard position by a predetermined time constant, said optical axes of said correction optical systems being coaxial with optical axes of other optical systems of imaging optical systems of said optical device at said standard position.

2. The device of claim 1, wherein said predetermined time constant is set such that said correction optical systems reach said standard position from a boundary position of said correctable range in approximately 5 seconds.

3. The device of claim 1, wherein said optical device further comprises:

a photographing optical system; and a photographing control system that records an image of said object, controlling an image capturing operation;

wherein said controlling system carries out said stop and said restart control of driving said correction optical systems after said tremble of said optical axes becomes beyond said correctable range, only when said image capturing operation is not carried out.

4. A camera which is provided with a device for correcting a tremble of a focused image comprising:

a photographing optical system;

tremble detectors that detect a tremble of an optical axis of said photographing optical system;

a correction optical system that corrects said tremble of said optical axis, being provided for said tremble correcting device so as to be included in said photographing optical system;

a driving device that drives said correction optical system;

a photographing controlling system that records an image of said object, controlling an image capturing operation; and a tremble correction controlling system that controls said driving device such that said correction optical system is driven following said tremble of said optical axis in order to cancel a focused image tremble of an object due to said tremble of said optical axis;

wherein said tremble correction controlling system controls said driving device such that:

when said tremble of said optical axis becomes beyond a correctable range of said correction optical system, said correction optical system is stopped from being driven following said tremble of said optical axis;

when a direction of said tremble of said optical axis is reversed in a situation that said tremble of said optical axis is out of said correctable range, said correction optical system is restarted, after having been stopped, to be driven following said tremble of said optical axis; and when said tremble correction controlling system controls said driving device, such that from a time after which said tremble of said optical axis becomes beyond said correctable range till a time at which said direction of said tremble of said optical axis is reversed, said correction optical system approaches a standard position by a predetermined time constant, an optical axis of said correction optical system being coaxial with optical axes of other optical systems of said photographing optical system at said standard position.

5. The device of claim 4, wherein said predetermined time constant is set such that said correction optical system reaches said standard position from a boundary position of said correctable range in approximately 5 seconds.

6. A device for correcting a tremble of a focused image comprising:

a tremble detector that detects a tremble of optical axes of an optical device;

correction optical systems that correct said tremble of said optical axes;

driving devices that drive said correction optical systems;

a controlling system that controls said driving devices such that said correction optical systems are driven following said tremble of said optical axes in order to cancel a focused image tremble of an object due to said tremble of said optical axes;

wherein said controlling system controls said driving devices such that:

when said tremble of said optical axes becomes beyond a correctable range of said correction optical systems, said correction optical systems are stopped from being driven following said tremble of said optical axes;

when a direction of said tremble of said optical axes is reversed in a situation that said tremble of said optical axes is out of said correctable range, said correction optical systems are restarted, after having been stopped, to be driven following said tremble of said optical axes; and when said tremble of said optical axes becomes beyond said correctable range till a time at which said direction of said tremble of said optical axes is reversed, said controlling system stops said correction optical systems at positions at which said correction optical systems are situated immediately before said tremble of said optical axes becomes beyond said correctable range.

7. A camera which is provided with a device for correcting a tremble of a focused image comprising:

a photographing optical system;

tremble detectors that detect a tremble of an optical axis of said photographing optical system;

a correction optical system that corrects said tremble of said optical axis, being provided for said tremble correcting device so as to be included in said photographing optical system;

a driving device that drives said correction optical system;

a photographing controlling system that records an image of said object, controlling an image capturing operation; and a tremble correction controlling system that controls said driving device such that said correction optical system is driven following said tremble of said optical axis in order to cancel a focused image tremble of an object due to said tremble of said optical axis;

wherein said tremble correction controlling system controls said driving device such that:

when said tremble of said optical axis becomes beyond a correctable range of said correction optical system, said correction optical system is stopped from being driven following said tremble of said optical axis;

when a direction of said tremble of said optical axis is reversed in a situation that said tremble of said optical axis is out of said correctable range, said correction optical system is restarted, after having been stopped, to be driven following said tremble of said optical axis; and when at a time after said focused image tremble becomes beyond said correctable range until a time at which said direction is reversed, said controlling system stops said correction optical system at a position at which said correction optical system is situated immediately before said tremble of said optical axis of said photographing optical system becomes beyond said correctable range.

* * * * *